United States Patent
Hamilton et al.

(10) Patent No.: US 10,897,070 B2
(45) Date of Patent: Jan. 19, 2021

(54) CONNECT RV MOUNT

(71) Applicant: WILSON ELECTRONICS, LLC, St. George, UT (US)

(72) Inventors: Aaron Jay Hamilton, Royse City, TX (US); Brooks Stephen Ruhman, Dallas, TX (US)

(73) Assignee: Wilson Electronics, LLC, St. George, UT (US)

( * ) Notice: Subject to any disclaimer, the term of this patent is extended or adjusted under 35 U.S.C. 154(b) by 28 days.

(21) Appl. No.: 16/529,647

(22) Filed: Aug. 1, 2019

(65) Prior Publication Data

US 2020/0044304 A1 Feb. 6, 2020

Related U.S. Application Data

(60) Provisional application No. 62/713,147, filed on Aug. 1, 2018.

(51) Int. Cl.
| | |
|---|---|
| *H01Q 1/12* | (2006.01) |
| *H01Q 1/32* | (2006.01) |
| *H04W 16/26* | (2009.01) |

(52) U.S. Cl.
CPC ......... *H01Q 1/1242* (2013.01); *H01Q 1/1228* (2013.01); *H01Q 1/32* (2013.01); *H04W 16/26* (2013.01)

(58) Field of Classification Search
CPC ........ H01Q 1/32; H01Q 1/325; H01Q 1/3283; H01Q 1/3291
See application file for complete search history.

(56) References Cited

U.S. PATENT DOCUMENTS

| | | | |
|---|---|---|---|
| 3,860,932 A * | 1/1975 | Hochbrueckner | ... H01Q 1/1235 343/713 |
| 4,776,032 A | 10/1988 | Odate et al. | |
| 5,102,375 A * | 4/1992 | Featherstone | ............ B66F 3/06 227/99 |
| 5,303,395 A | 1/1994 | Dayani | |
| 5,737,687 A | 4/1998 | Martin et al. | |
| 5,777,530 A | 7/1998 | Nakatuka | |
| 5,835,848 A | 11/1998 | Bi et al. | |

(Continued)

FOREIGN PATENT DOCUMENTS

| | | | | |
|---|---|---|---|---|
| EP | 1525678 B1 | 7/2008 | | |
| WO | WO-2017143054 A1 * | 8/2017 | ............. | H04W 8/20 |
| WO | WO-2017146433 A1 * | 8/2017 | ............. | H01Q 9/28 |

OTHER PUBLICATIONS

3GPP2 C.S0011-B; "Recommended Minimum Performance Standards for cdma2000® Spread Spectrum Mobile Stations"; TIA-98-E; (Dec. 13, 2002); 448 pages; Release B, V1.0, Revision E.

(Continued)

*Primary Examiner* — Seokjin Kim
(74) *Attorney, Agent, or Firm* — Thorpe North & Western

(57) ABSTRACT

A mount system mounts an accessory, such as an antenna, to a recreational vehicle (RV). The mount system comprises a telescoping mast and upper and lower mounts coupled between the mast and the RV. Upper and lower pocket mounts are mounted to the RV while upper and lower inserts are mounted to the mast. The upper and lower inserts are received in the upper and lower pocket mounts to quickly and releasably mount the mast to the RV.

33 Claims, 11 Drawing Sheets

(56) References Cited

U.S. PATENT DOCUMENTS

| | | | |
|---|---|---|---|
| 5,961,092 A * | 10/1999 | Coffield | H01Q 1/125 |
| | | | 248/230.1 |
| 6,005,884 A | 12/1999 | Cook et al. | |
| 6,711,388 B1 | 3/2004 | Neitiniemi | |
| 6,889,033 B2 | 5/2005 | Bongfeldt | |
| 6,990,313 B1 | 1/2006 | Yarkosky | |
| 7,035,587 B1 | 4/2006 | Yarkosky | |
| 7,221,967 B2 | 5/2007 | Van Buren et al. | |
| 7,974,573 B2 | 7/2011 | Dean | |
| 8,902,121 B1 * | 12/2014 | Locker | H01Q 1/08 |
| | | | 343/874 |
| 9,711,859 B1 * | 7/2017 | Muesse | H01Q 1/362 |
| 10,074,896 B1 * | 9/2018 | Haiflich | H01Q 1/1221 |
| 10,312,576 B2 * | 6/2019 | DeBusk | H01Q 21/30 |
| 2002/0044594 A1 | 4/2002 | Bongfeldt | |
| 2003/0107526 A1 * | 6/2003 | Kleinschmidt | H01Q 19/13 |
| | | | 343/883 |
| 2003/0123401 A1 | 7/2003 | Dean | |
| 2004/0137854 A1 | 7/2004 | Ge | |
| 2004/0146013 A1 | 7/2004 | Song et al. | |
| 2004/0166802 A1 | 8/2004 | McKay, Sr. et al. | |
| 2004/0219876 A1 | 11/2004 | Baker et al. | |
| 2004/0235417 A1 | 11/2004 | Dean | |
| 2005/0118949 A1 | 6/2005 | Allen et al. | |
| 2006/0084379 A1 | 4/2006 | O'Neill | |
| 2007/0071128 A1 | 3/2007 | Meir et al. | |
| 2007/0188235 A1 | 8/2007 | Dean | |
| 2008/0061211 A1 * | 3/2008 | Madsen | H01Q 1/10 |
| | | | 248/519 |
| 2008/0081555 A1 | 4/2008 | Kong | |
| 2008/0096483 A1 | 4/2008 | Van Buren et al. | |
| 2008/0278237 A1 | 11/2008 | Blin | |
| 2009/0051608 A1 * | 2/2009 | Johnson | H01Q 1/1242 |
| | | | 343/713 |
| 2009/0267865 A1 * | 10/2009 | Miller | H01Q 1/1242 |
| | | | 343/901 |
| 2010/0295751 A1 * | 11/2010 | Sheers | H01Q 1/10 |
| | | | 343/901 |
| 2011/0151775 A1 | 6/2011 | Kang et al. | |
| 2011/0196581 A1 * | 8/2011 | Zurfluh | H01Q 1/3216 |
| | | | 701/49 |
| 2012/0110927 A1 * | 5/2012 | Liestenfeltz | E04H 12/182 |
| | | | 52/121 |
| 2014/0231612 A1 * | 8/2014 | O'Neal | H01Q 1/3258 |
| | | | 248/539 |
| 2016/0093945 A1 * | 3/2016 | Grodahl | E04H 12/18 |
| | | | 248/514 |
| 2016/0301128 A1 * | 10/2016 | Blackwelder | E04H 12/182 |
| 2017/0346171 A1 * | 11/2017 | Cedertorn | F16C 11/045 |
| 2019/0058239 A1 * | 2/2019 | Smith | H01Q 1/1242 |
| 2019/0245260 A1 * | 8/2019 | Dominguez | H01Q 1/246 |
| 2019/0356035 A1 * | 11/2019 | Dominguez | E04H 12/2238 |

OTHER PUBLICATIONS

ADL5513; "1 MHz to 4 GHz, 80 dB Logarithmic Detector/Controller"; Data Sheet; (2008); 12 pages; Analog Devices, Inc.

HMC713LP3E; "54 dB, Logarithmic Detector / Controller, 50-8000 MHz"; Data Sheet; (2010); 12 pages.

HMC909LP4E; "RMS Power Detector Single-Ended, DC—5.8 GHz"; Data Sheet; (2010); 21 pages.

PIC16F873; "28/40-Pin 8-Bit CMOS Flash Microcontrollers"; (2001); Data Sheet; 218 pages.

\* cited by examiner

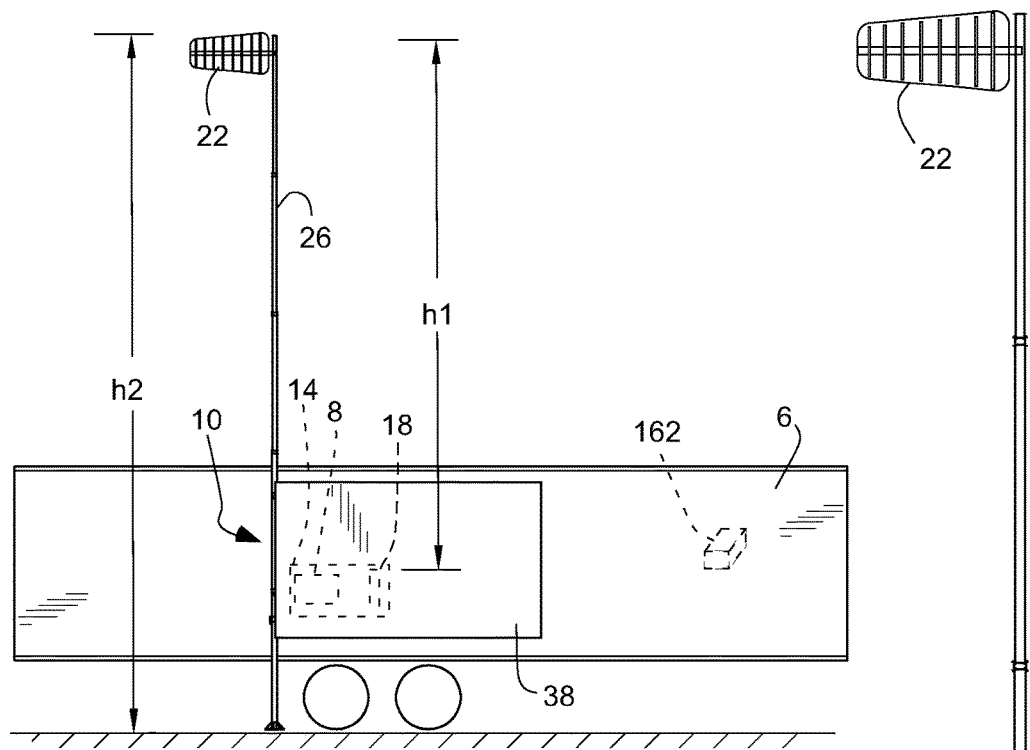
Fig. 1a
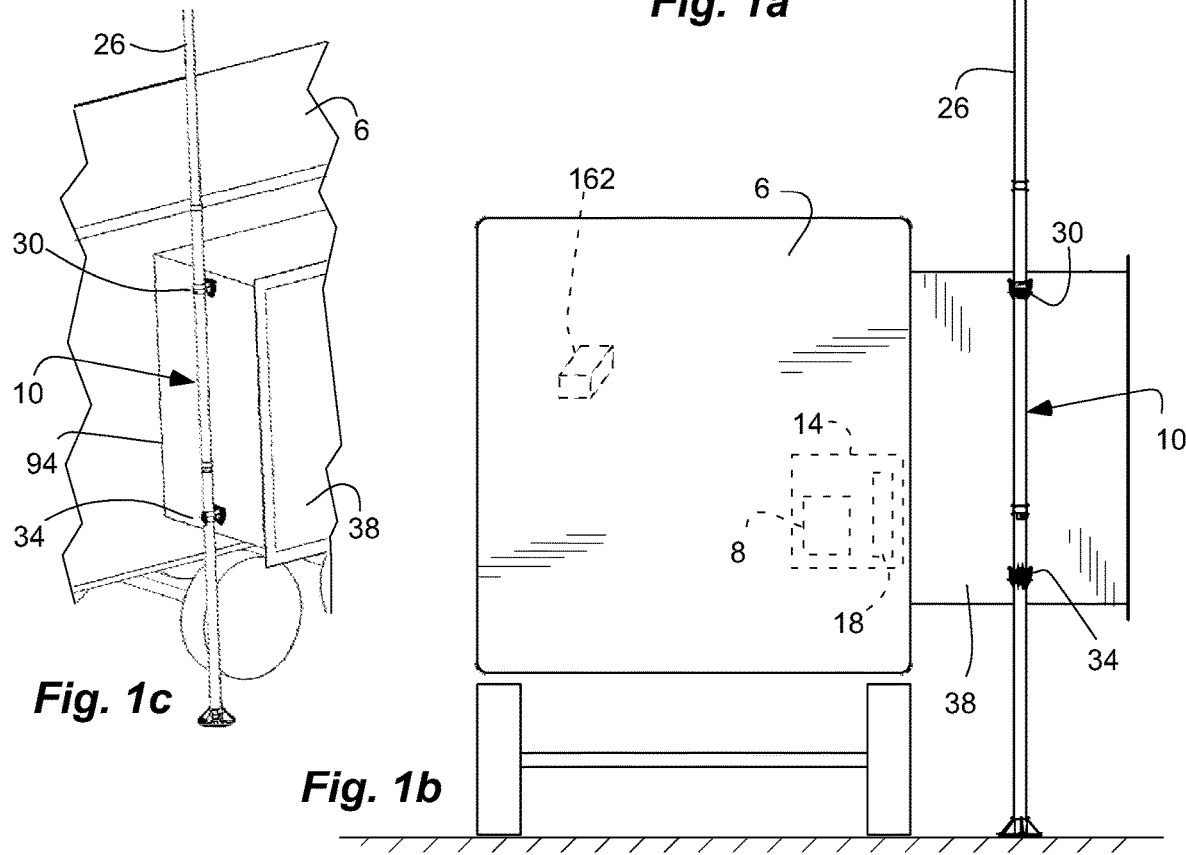
Fig. 1c
Fig. 1b

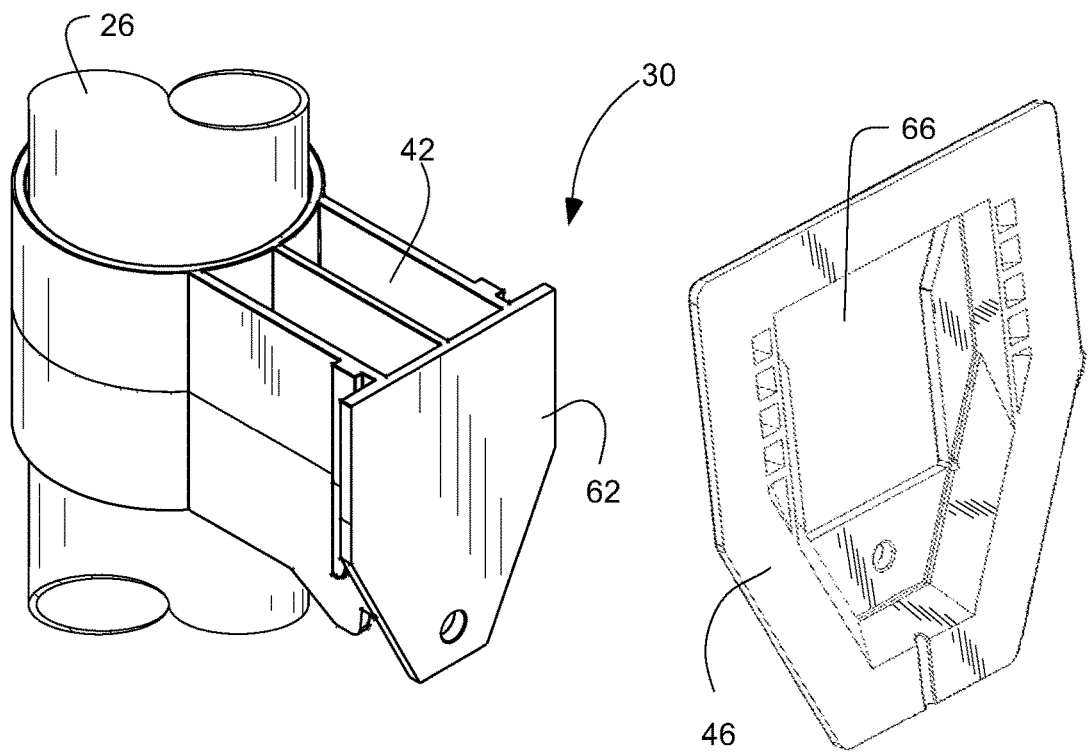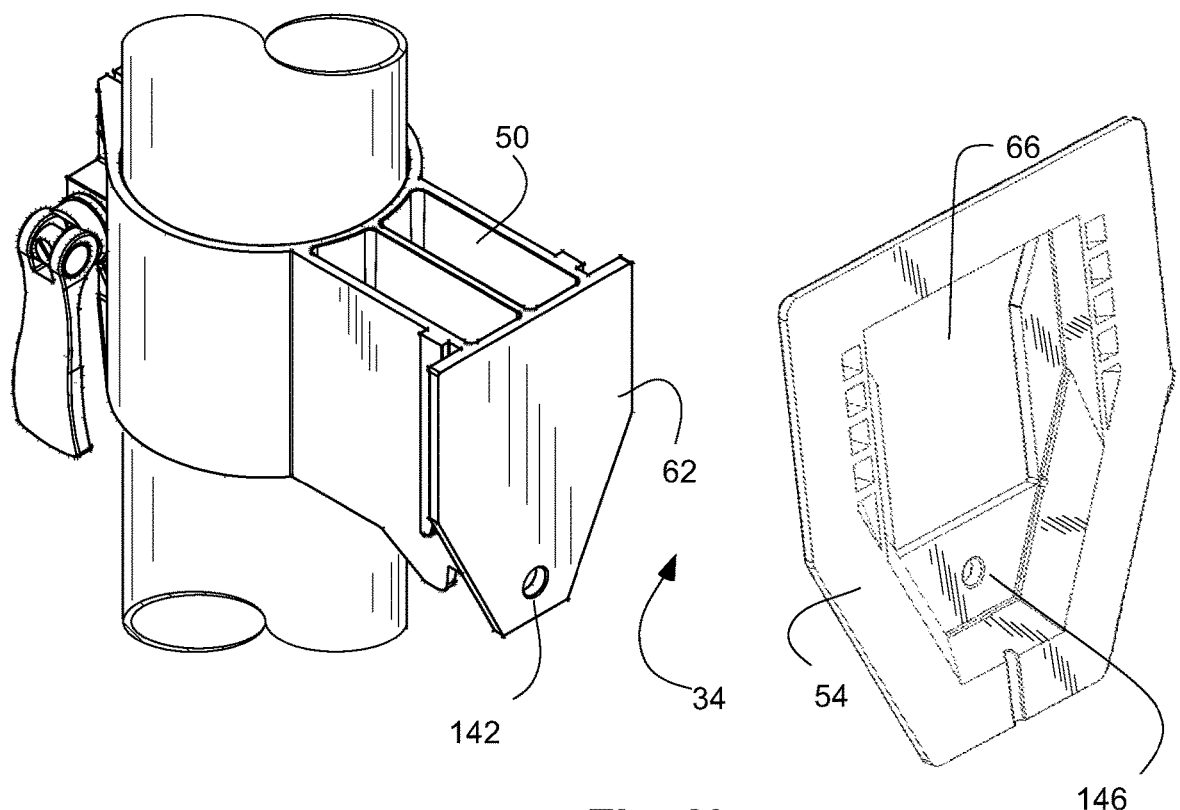
*Fig. 2b*

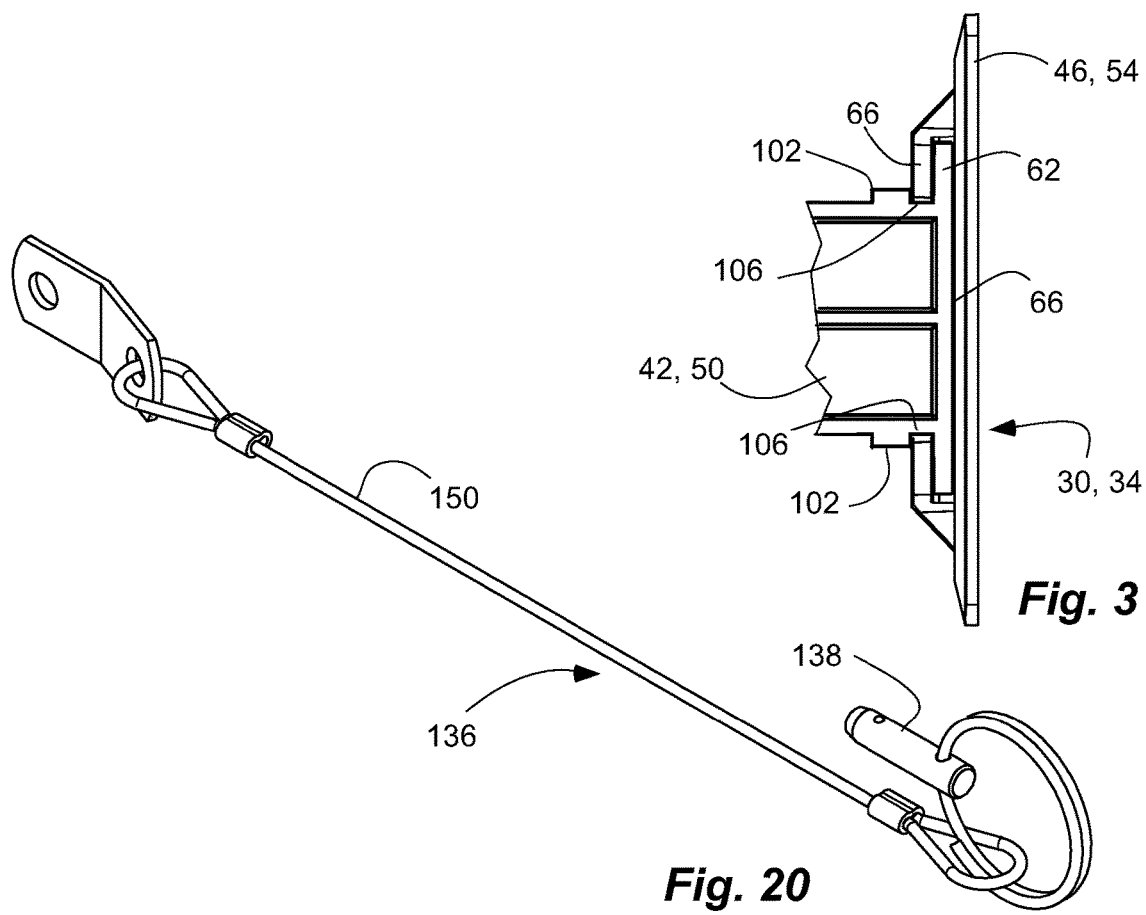
Fig. 3
Fig. 20
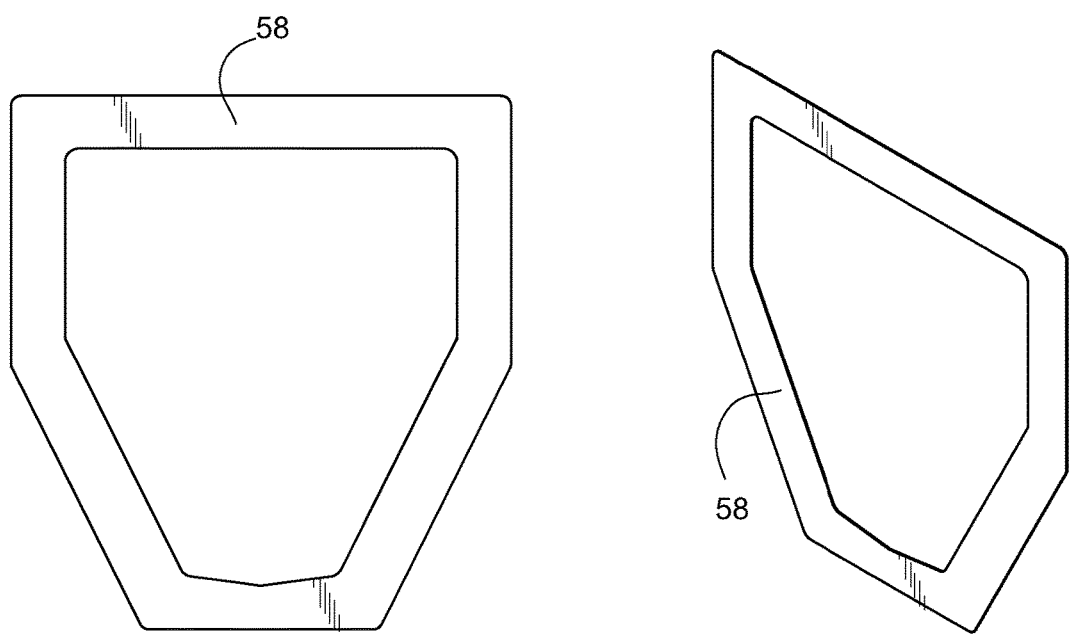
Fig. 10b
Fig. 10a

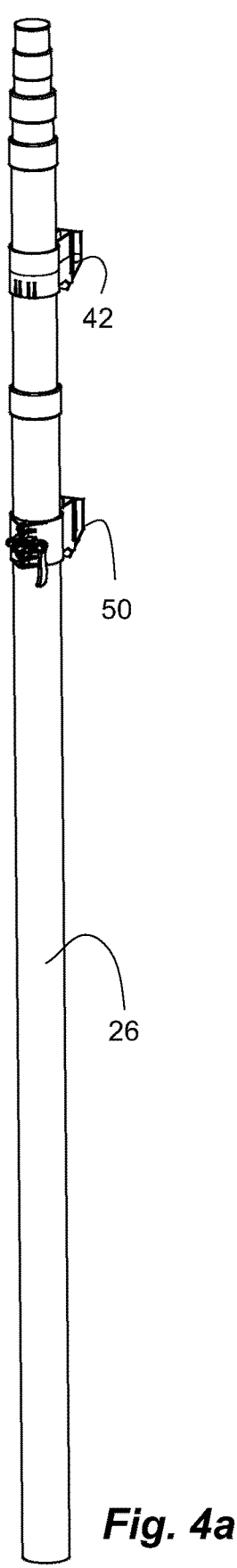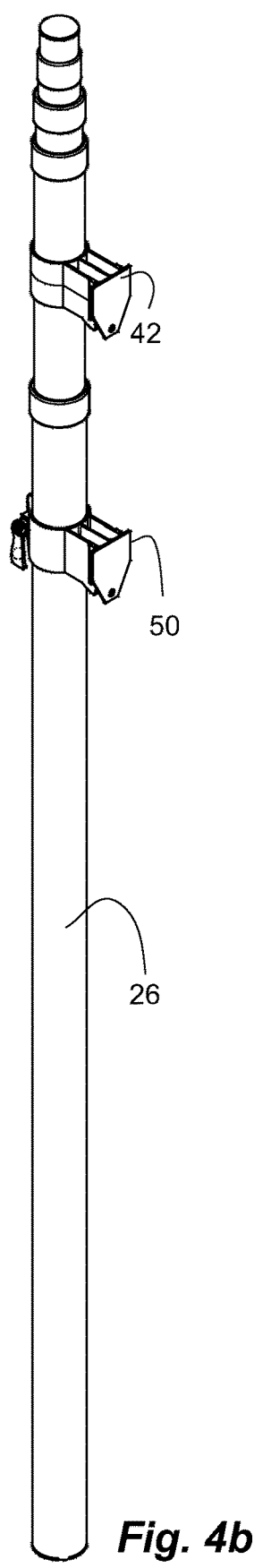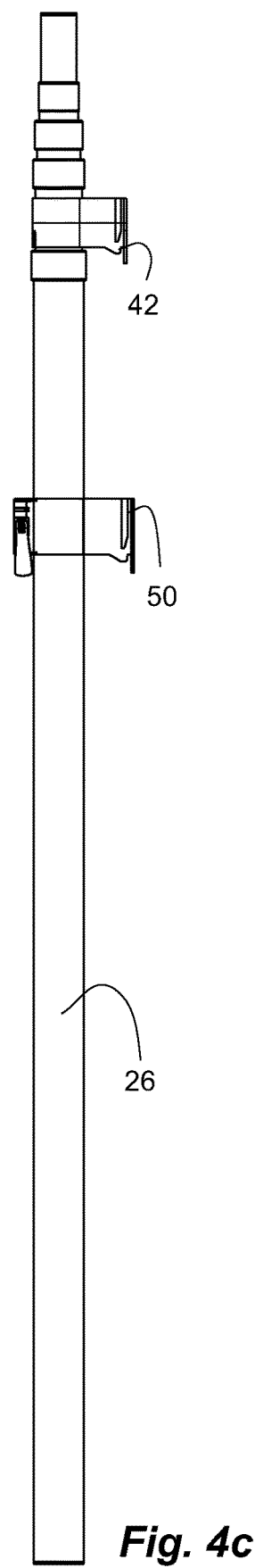
*Fig. 4a*  *Fig. 4b*  *Fig. 4c*

CONNECT RV MOUNT

RELATED APPLICATIONS

The present application claims the benefit of U.S. Provisional Patent Application No. 62/713,147 filed Aug. 1, 2018, the entire specification of which is hereby incorporated by reference in its entirety for all purposes.

BACKGROUND

Wireless communication systems, such as cellular telephone systems, have become common throughout the world. A wireless repeater or booster is a radio frequency (RF) device used to amplify wireless communication signals in both uplink and downlink communication channels. The uplink channel is generally referred to as the communication direction from one or more wireless user devices to a base station. The downlink channel is generally referred to as the communication direction from the base station to the wireless user device. For a wireless telephone system, the base station may be a cell tower, and the wireless user device may be one or more smart phones, one or more tablets, one or more laptops, one or more desktop computers, one or more multimedia devices such as televisions or gaming systems, one or more cellular internet of things (CIoT) devices, and/or other types of computing devices typically referred to as user equipment (UEs). The repeater typically includes one or more signal amplifiers, one or more duplexers and/or couplers, one or more filters and other circuits coupled between two or more antennas. The antennas can include one or more server antennas and one or more donor antennas.

DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 1a is schematic side view of a mount system shown mounting an antenna mast to a recreational vehicle (RV), in accordance with an example;

FIG. 1b is a schematic end view of the mount system of FIG. 1a;

FIG. 1c is a schematic partial perspective view of the mount system of FIG. 1a;

FIG. 2b is a schematic partial exploded rear perspective view of the mount system of FIG. 1a;

FIG. 3 is a partial top view of the upper or lower insert received in the upper or lower pocket mount, respectively, of the mount system of FIG. 1a;

FIG. 4a is a perspective front view of a mast with the upper and lower inserts of the mount system of FIG. 1a, and shown with the mast in a retracted configuration;

FIG. 4b is a perspective rear view of the mast with the upper and lower inserts of the mount system of FIG. 1a;

FIG. 4c is a side view of the mast with the upper and lower inserts of the mount system of FIG. 1a;

FIG. 5 is a front view of the upper or lower pocket mount of the mount system of FIG. 1a;

FIG. 6 is a top view of the upper or lower pocket mount of the mount system of FIG. 1a;

FIG. 7 is a rear view of the upper or lower pocket mount of the mount system of FIG. 1a;

FIG. 8 is a side view of the upper or lower pocket mount of the mount system of FIG. 1a;

FIG. 10a is a perspective view of an adhesive layer of the upper or lower pocket mount of the mount system of FIG. 1a;

FIG. 10b is a front view of an adhesive layer of the upper or lower pocket mount of the mount system of FIG. 1a;

FIG. 11a is a top perspective view of the upper insert of the mount system of FIG. 1a;

FIG. 11b is a bottom perspective view of the upper insert of the mount system of FIG. 1a;

FIG. 13 is a side view of the upper insert of the mount system of FIG. 1a;

FIG. 14 is a rear view of the upper insert of the mount system of FIG. 1a;

FIG. 15a is a top perspective view of the lower insert of the mount system of FIG. 1a;

FIG. 15b is a bottom perspective view of the lower insert of the mount system of FIG. 1a;

FIG. 16 is a top view of the lower insert of the mount system of FIG. 1a;

FIG. 17 is a side view of the lower insert of the mount system of FIG. 1a;

FIG. 18 is a rear view of the lower insert of the mount system of FIG. 1a;

FIG. 19 is a front view of the lower insert of the mount system of FIG. 1a;

FIG. 20 is a perspective view of a locking pin on a lanyard of the lower insert of the mount system of FIG. 1a;

FIG. 21 is a perspective view of a foot of the mount system of FIG. 1a;

FIG. 22 is a top view of a foot of the mount system of FIG. 1a;

FIG. 24 is a bottom view of the foot of the mount system of FIG. 1a.

Figure 2A:
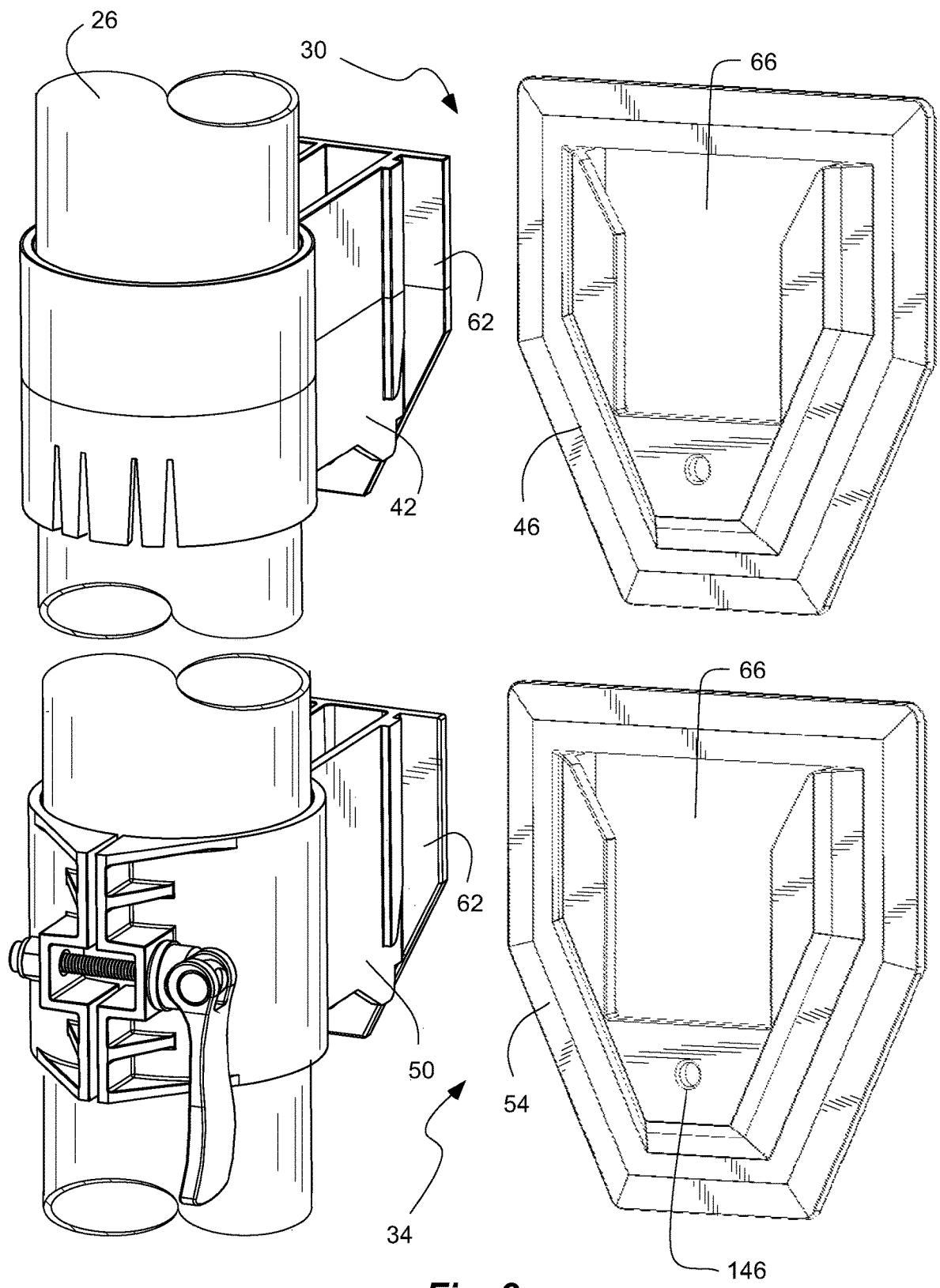
FIG. 2a is a schematic partial exploded front perspective view of the mount system of FIG. 1a, showing upper and lower mounts with upper and lower inserts removed from upper and lower pocket mounts, respectively.
Figure 5:
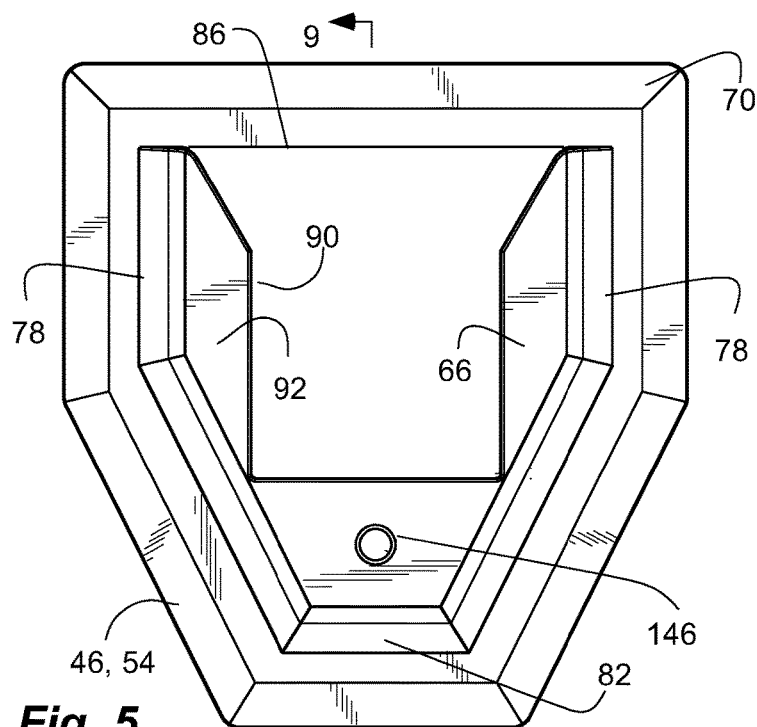
Figure 8:
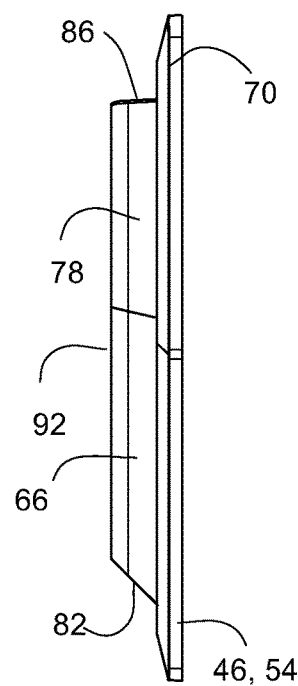
Figure 6:
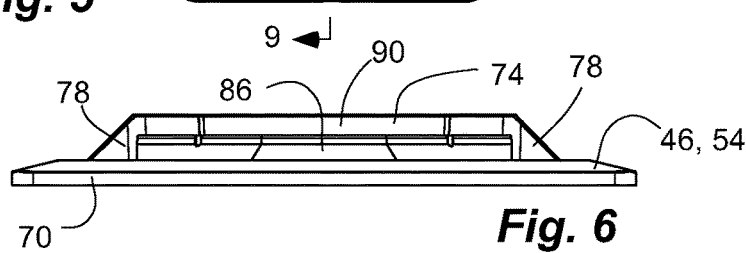

Reference will now be made to the exemplary embodiments illustrated, and specific language will be used herein to describe the same. It will nevertheless be understood that no limitation of the scope of the technology is thereby intended.

DETAILED DESCRIPTION OF THE INVENTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Wireless user devices, such as cell phones, can be used in vehicles, such as cars, along with a signal booster or wireless repeater to amplify wireless communication signals. The signal booster or wireless repeater can comprise an exterior donor antenna and an interior server antenna. Such signal boosters or wireless repeaters in vehicles can have limited or relatively small power. Recreational vehicles (RVs), such as motor homes or travel trailers, provide a particular challenge because they can be located remotely, and thus in greater need for signal boosting, yet have greater interior space that can exceed the limited power provided by typical repeaters. Simply providing greater power to accommodate the greater interior space of the RV can cause interference with an exterior donor antenna. Thus, the exterior donor antenna needs to be separated from the interior server antenna sufficiently to reduce interference or an oscillation loop. In one example, at least 19 feet of separation can be provided between the donor and server antennas, and/or with the exterior donor antenna being at least 23 feet off of the ground, while providing sufficient power at the server antenna to provide cellular signal coverage in the interior of the RV. It will be appreciated that an RV cannot travel on a roadway with such an antenna. In addition, RV owners can be sensitive to modification made to their RVs. Therefore, there is a continuing need for improved wireless repeater systems that can provide adequate coverage for larger RV interior spaces, while avoiding interference or an oscillation loop between the antennas.

A mount system can be provided to removably mount an antenna to an RV. The mount system can be part of the wireless repeater system, or part of the signal booster or wireless repeater. The wireless repeater can comprise an amplifier and an interior server antenna disposed in the RV, such as on a counter, and a stowable exterior donor antenna. The mount system can elevate an antenna, referred to as an exterior donor antenna, to a sufficient elevation (e.g. at least 19 feet above an interior server antenna disposed in the RV, or at least 23 feet above the ground) to separate the donor and server antennas. The exterior donor antenna can be an omnidirectional antenna, a directional antenna, a Yagi antenna, or another type of antenna.

The exterior donor antenna can be mounted on a mast, which in turn can be mounted to the RV for stability and support. The mount system can releasably couple the mast to the RV without requiring holes to be drilled into the RV, or otherwise permanently mount components to the RV. The mount system can be mounted to the skin, such as bonded fiberglass, of the RV. In addition, the mount system can be mounted to an interior end of a slider (e.g. a room portion that extends from and retracts into) of the RV. The mount system allows a portion of the mount system to be installed on the RV, while another portion of the mount system is removably mounted thereto. Thus, the mount system, or the mast and the antenna, can be selectively mounted for use, and removed for storage and transportation. The mount system can also be mounted to the interior end of the slider of the RV without interfering with operation (extension and retraction) of the slider. In addition, the mount system can anchor the mast to the RV or the slider thereof for lateral support, while transferring a majority of the weight of the mast and the antenna to the ground, so as to not strain the mount system or the skin of the RV. In addition, the mount system can allow the mast to be locked vertically for safety, and rotationally to maintain the orientation of the directional antenna. Furthermore, the mount system can be configured to be quickly and easily utilized.

In one example, mount system can comprise a telescoping mast with a bottom to be disposed on the ground, a top to carry an antenna, and an intermediate portion to be releasably coupled to the RV. The mount system can comprise upper and lower mounts to couple the mast to the RV. The upper mount is located above the lower mount. The upper mount can be located near a top of the RV or the slider thereof, while the lower mount can be located near a bottom of the RV or the slider thereof. The upper mount comprises an upper insert carried by the mast, and removably coupled to an upper pocket mount carried by the RV. Similarly, the lower mount comprises a lower insert carried by the mast and a lower pocket mount carried by the RV. In one aspect, the upper insert can be captive on the mast so that a user can elevate the upper insert with the mast to reach the upper pocket mount near the top of the RV. In another aspect, the upper and lower pocket mounts can be mounted to the RV with a semi-permanent adhesive so that no drilling or permanent fasteners alter the skin of the RV. In another aspect, the mast can be slidable in the upper and lower inserts so that the mast can be disposed on the ground to transfer weight. In another aspect, the mast can be rotatable in the upper and lower inserts to orient the directional antenna thereon, and rotationally lockable to fix the direction of the antenna. In another aspect, the upper and lower pocket mounts can be thin (e.g. less than ½ inch thick) so that they can slide with the slider through an interface (e.g. wiper gasket) between the RV and the slider as the slider is extended and retracted. In another aspect, the upper and lower mounts can have insert plates sized and shaped to nest within open pockets of the upper and lower mount pocket mounts, respectively.

FIGS. 1a-1c depict examples of a recreational vehicle (RV) 6 with a signal booster or wireless repeater system 8 and a mount system 10 in an example of the invention. The RV 6 can be a motorhome, travel trailer, or the like with an interior space that is typically much greater than a standard automobile, and with a length much greater than the standard automobile. Thus, the repeater system 8 can have a range or power greater than a typical booster system for an automobile, such as greater than ten feet in one aspect. The repeater system 8 can have a base or housing 14 coupled to a power source, an interior server antenna 18 located in the RV 6, and an exterior donor antenna 22 located outside of the RV 6. In one aspect, the interior server antenna 18 can be part of, or disposed within, the base 14. In another aspect, the exterior donor antenna 22 can be a directional or Yagi antenna configured to be oriented towards a source signal or antenna. The exterior donor antenna 22 can be operatively coupled to the interior server antenna 18 and/or the wireless repeater 8 disposed inside the RV, such as by a cable (not shown). In one aspect, the base 14 and the interior server antenna 18 can be positioned on a counter in the RV 6, and thus can be located approximately 4-5 feet above the ground. As described above, it has been determined that the separation, and thus the elevation h1, between the interior server antenna 18 and the exterior donor antenna 22 should be at least 19 feet based on the size of the RV 6 and the range or power of the repeater system 8. Thus, it has been determined that the exterior donor antenna 22 should be elevated to an elevation h2 of at least 23 feet above the ground. While the elevations h1 and h2 are provided as examples, they are not intended to be limiting. The actual elevations can depend on the system design of the wireless repeater system 8, the type of antennas used for the interior server antenna 18 and the exterior donor antenna 22, shielding that is used between the antennas, system gain, and so forth. The height of a telescoping mast 26 can be selected to provide a desired distance between the interior server antenna 18 and the exterior donor antenna 22 to reduce oscillations that may occur due to unwanted feedback between the interior server antenna 18 and the exterior donor antenna 22.

The mount system 10 mounts the external donor antenna 22 to the RV 6. The mount system 10 can comprise the telescoping mast 26 that can extend and collapse between an extended configuration (FIGS. 1a and 1b) and a collapsed configuration (FIGS. 4a-c). In one aspect, the mast 26 can have an extended height of at least 25 feet in the extended configuration. Thus, the mast 26 can be extended and oriented vertically to raise, erect, deploy and/or hoist the antenna 22. In addition, the mast 26 can be collapsed to retract, lower, withdraw or retrieve the antenna 22. The mast 26 can be collapsed to a collapsed length or height less than approximately 8 feet or 95 inches. In one aspect, the mast 26 can collapse to approximately 74 inches. Thus, the mast 26, and the antenna 22 thereon, can be stored in the RV 6. The mast 26 can comprise multiple sections nesting within one another. In one aspect, the mast 26 can have five sections of approximately 5 feet in length. Furthermore, the mast 26 can have a bottom to be disposed on the ground so that the weight of the mast 26 and the antenna 22 is carried by the ground; a top to which the antenna 22 is coupled; and an intermediate portion that is mounted to the RV 6 for lateral support and stability. The mast 26 can comprise a lightweight material, such as aluminum, titanium, plastic, fiberglass, or carbon fiber tubes. Alternatively, a stronger material such as steel can be used to form the tubes in the mast 26. In one aspect, plastic collars can be disposed on ends of the sections or tubes. In one aspect, the collars can provide a fiction fit to maintain the relative positions of the sections and allow selective extension and retraction of the mast 26. In another aspect, the collars can provide a twist-lock.

The mount system 10 comprises upper and lower mounts 30 and 34 coupled to and between the mast 26 and the RV 6. The upper and lower mounts 30 and 34 are spaced-apart from one another, with the upper mount 30 located adjacent to or at the top of the RV 6 (and the second section of the mast 26), and the lower mount 34 located adjacent to or at the bottom of the RV 6 (and the first section of the mast 26). Thus, the upper mount 30 can be located approximately 10 feet above the ground. In addition, the upper and lower mounts 30 and 34 can be separated by approximately 6-8 feet. The RV 6 can comprise a slider 38 that can extend and tract from the RV 6, and which is considered part of the RV such that the upper and lower mounts 30 and 34 can also be coupled to the top and bottom of the slider 38.

FIGS. 2a, 2b and 3 depict examples of the upper and lower mounts 30 and 34. Each of the upper and lower mounts 30 and 34 can comprise an insert carried by the mast 26 and removably received within a pocket mount carried by the RV 6. The upper mount 30 comprises an upper insert 42 carried by the mast 26 (and the second section thereof) and removably coupled to an upper pocket mount 46 carried by the RV 6. Similarly, the lower mount 34 comprises a lower insert 50 carried by the mast 26 (and the first section thereof) and removably coupled to a lower pocket mount 54 carried by the RV 6. The upper and lower pocket mounts 46 and 54 can be identical or substantially the same, and can be spaced-apart from one another with the upper pocket mount 46 located at the top of the RV 6 or the slider 38 (FIGS. 1a-c) thereof, and the lower pocket mount 54 located at the bottom of the RV 6 or the slider 38 thereof. In one aspect, the upper and lower pocket mounts 46 and 54 can be adhered to the RV 6 or the slider 38, or the skin thereof, with an adhesive layer 58 (FIGS. 10a and 10b), rather than mechanical fasteners and/or drilling into the skin. Each insert 42 and 50 can have an insert plate 62, and each pocket mount 46 and 54 can have an open pocket 66 to removably receive a respective insert plate 62. Thus, the upper insert 42 is removably coupled to the upper pocket mount 46, while the lower insert 50 is removably coupled to the lower pocket mount 54.

FIGS. 4a-c depict examples of the mast 26 in a collapsed configuration. As described above, the mast 26 can be collapsed to the collapsed length or height less than approximately 8 feet or 95 inches. In addition, the mast 26 can have five sections of approximately 5 feet in length. The sections of the mast 26 can be hollow tubes with consecutively reduced diameter so that subsequent sections nest and slide within the previous sections. The upper insert 42 can be carried by the second section, while the lower insert 50 can be carried by the first section. The antenna 22 can be coupled to a final or fifth section, and the top of the mast 26.

Figure 7:
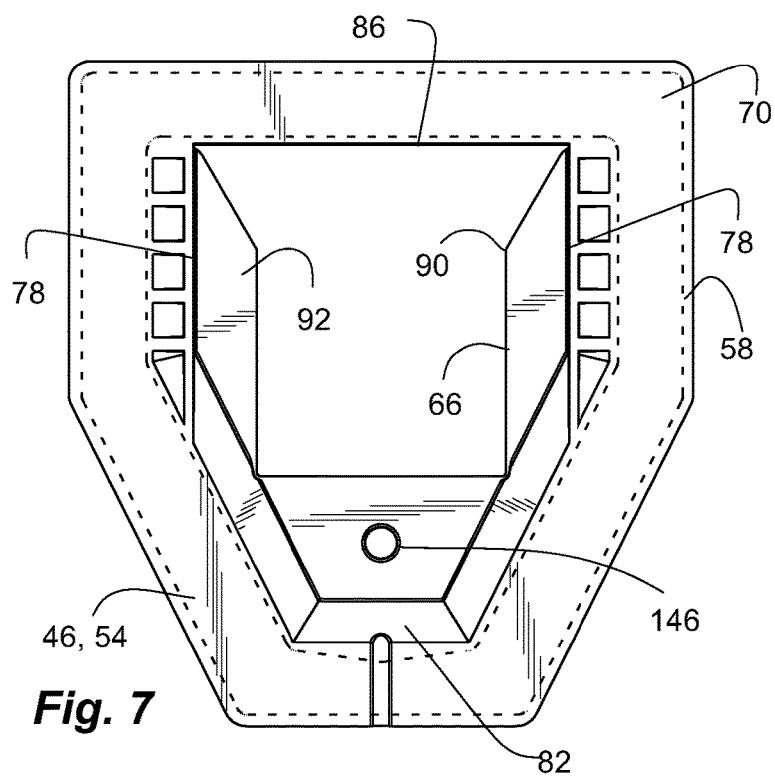
Figure 9:
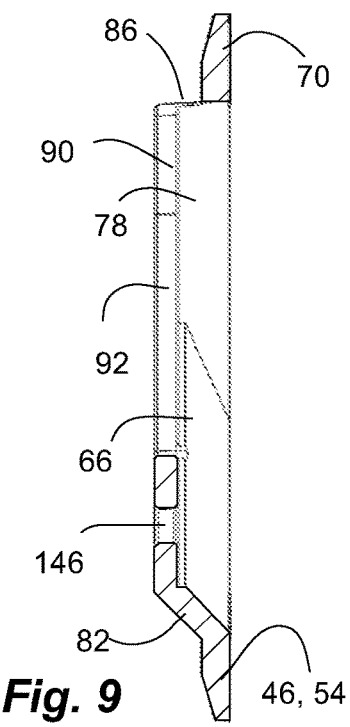
FIG. 9 is a cross-sectional side view of the upper or lower pocket mount of the mount system of FIG. 1a, taken along line 9 of FIG. 5.
Figure 11A:
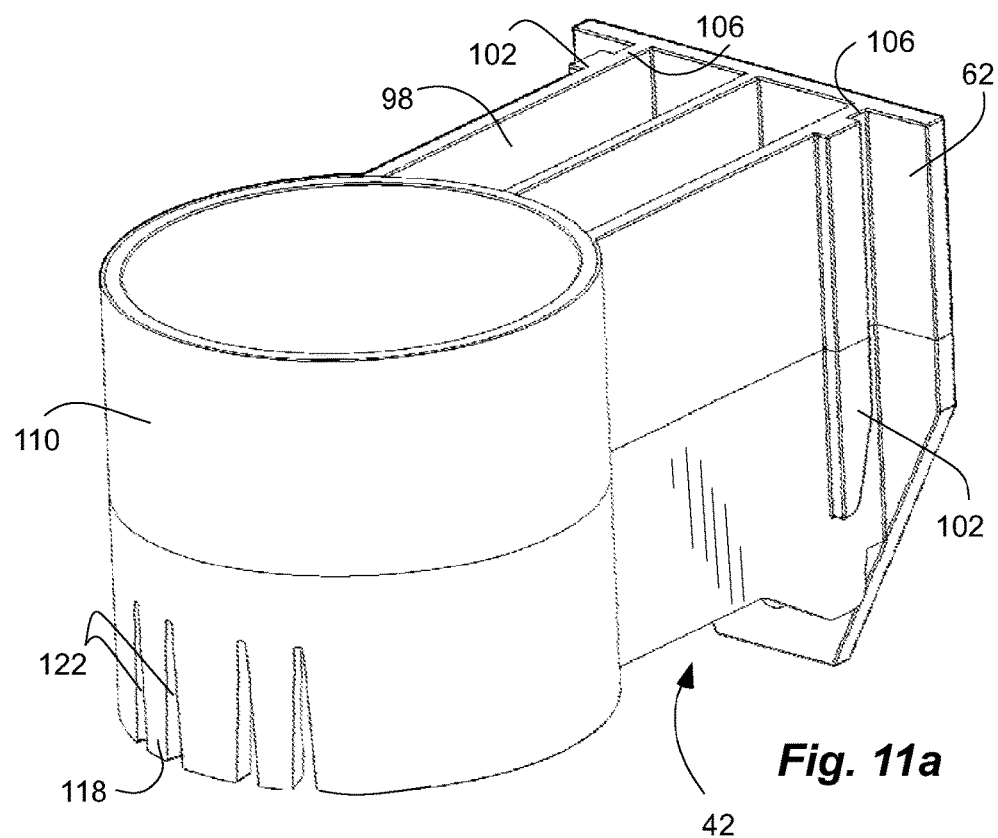
Figure 11B:
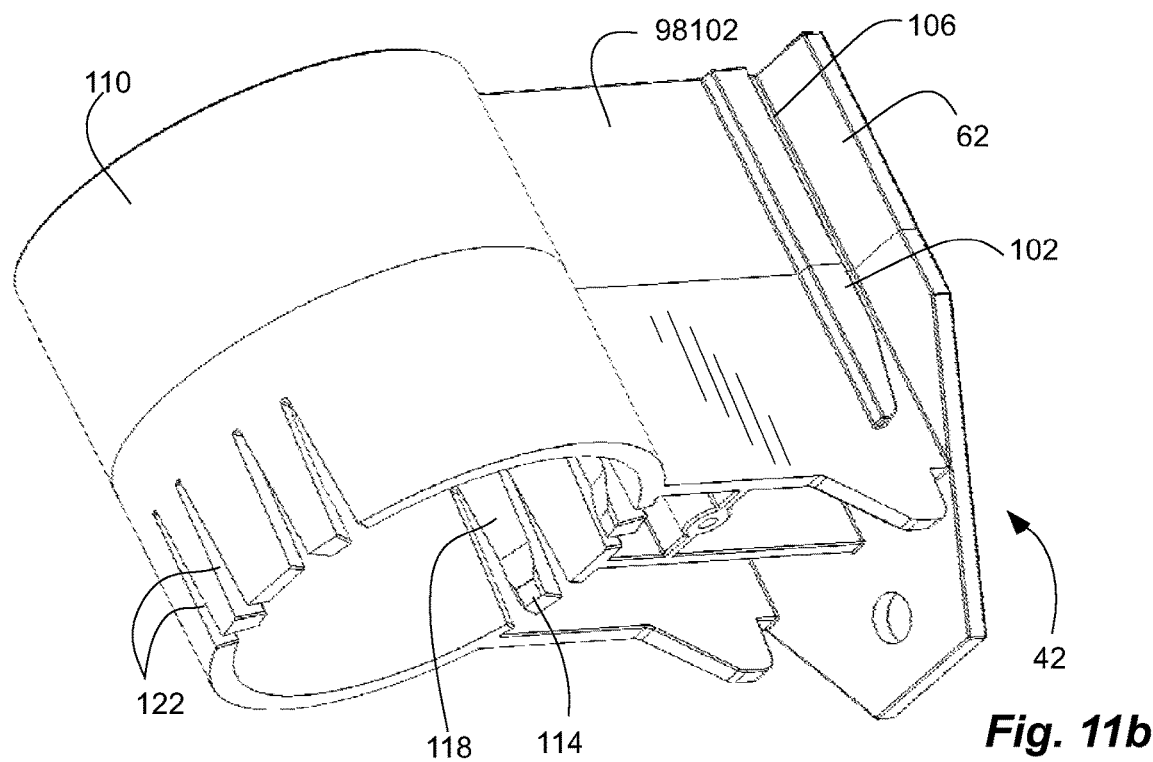
Figure 12:
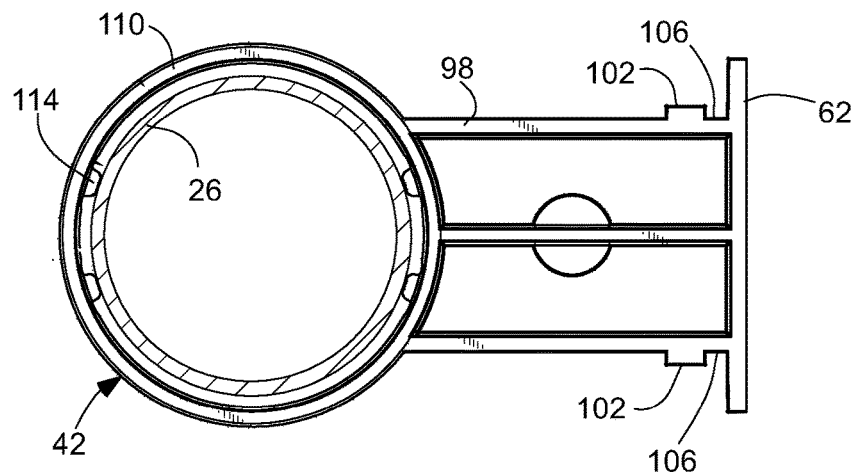
FIG. 12 is a top view of the upper insert of the mount system of FIG. 1a, shown with the mast.
Figure 13:
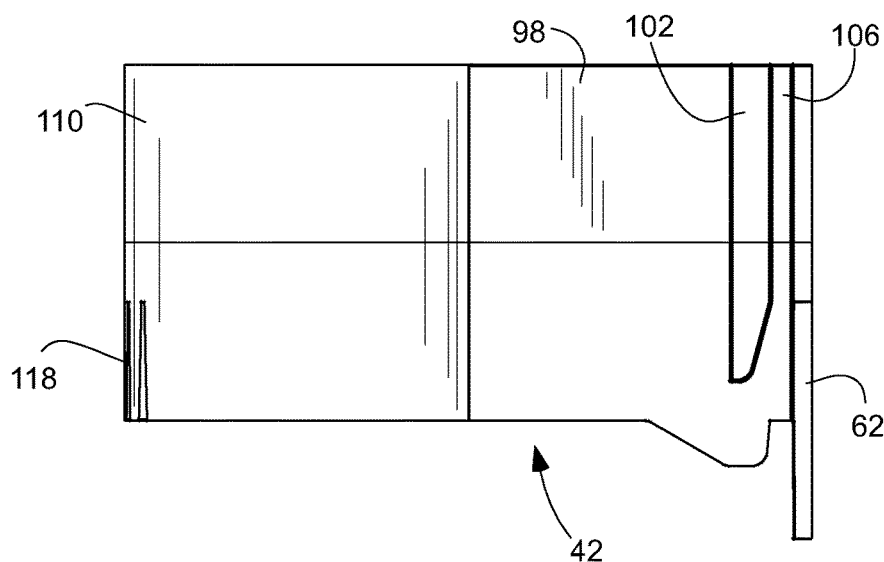
Figure 14:
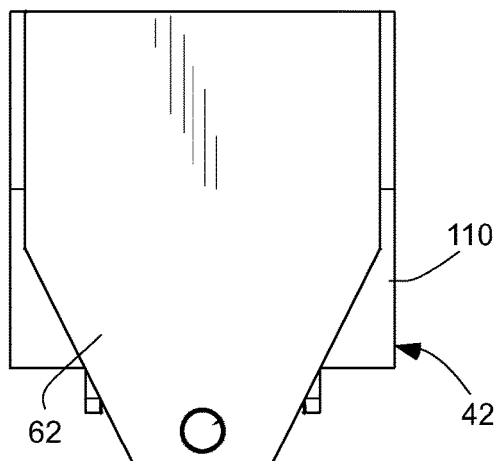
Figure 15A:
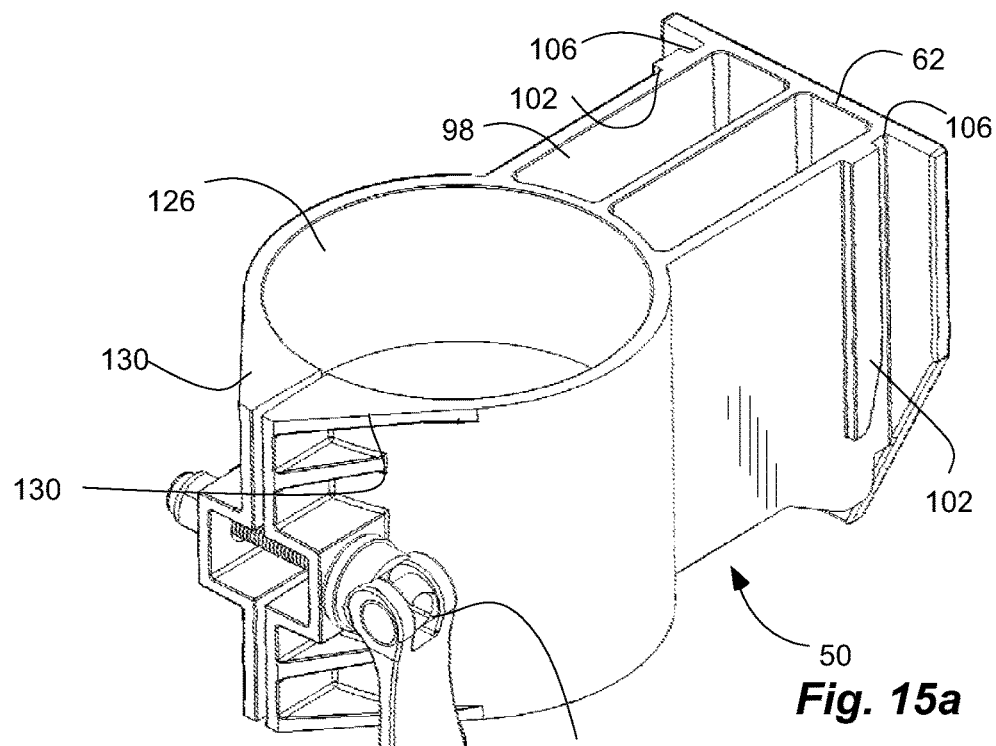
Figure 15B:
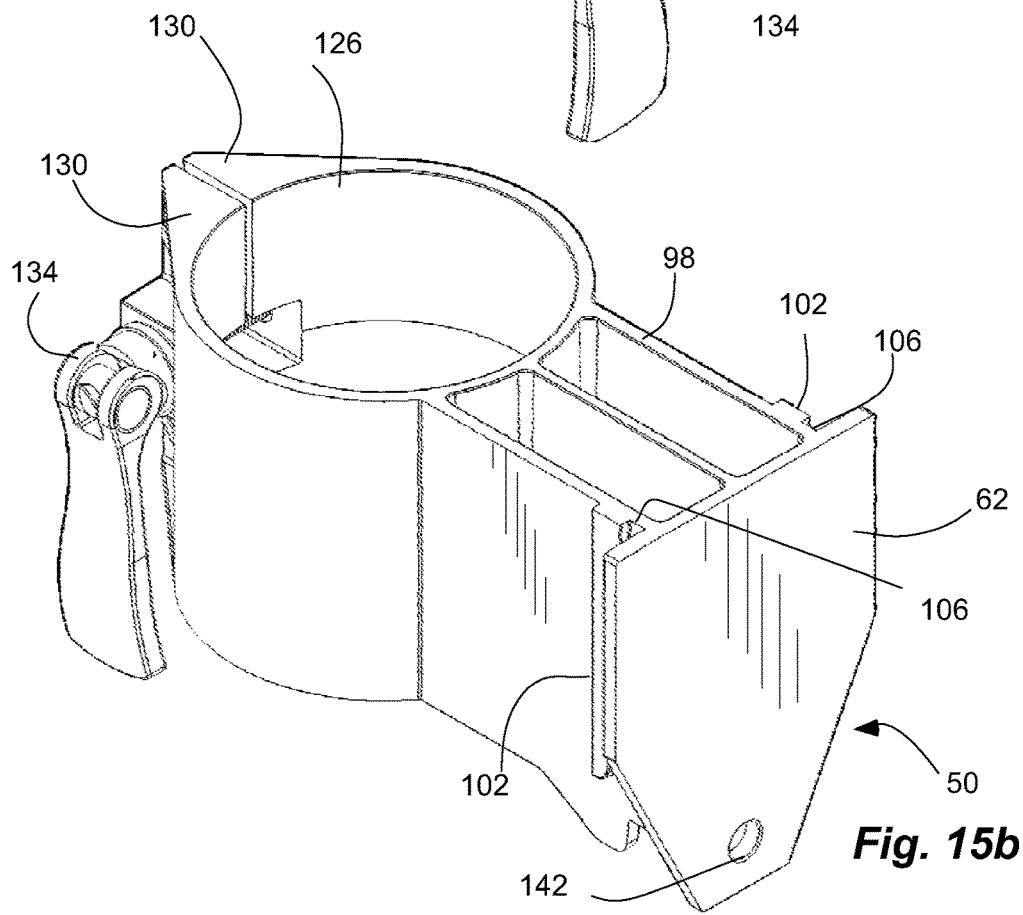
Figure 16:
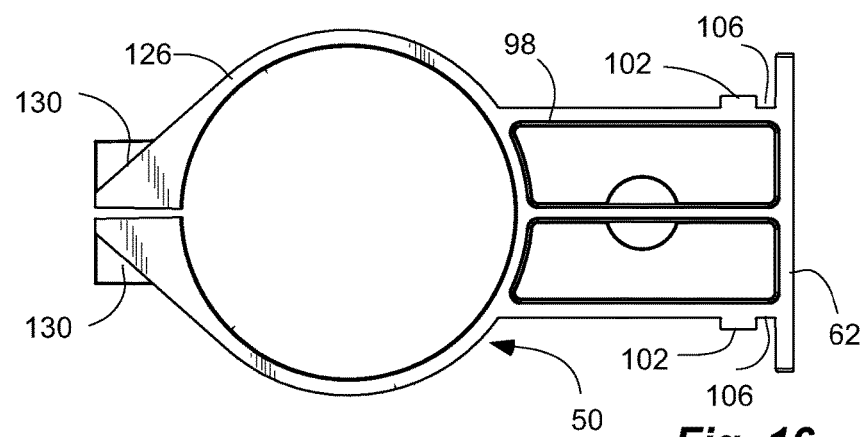
Figure 17:
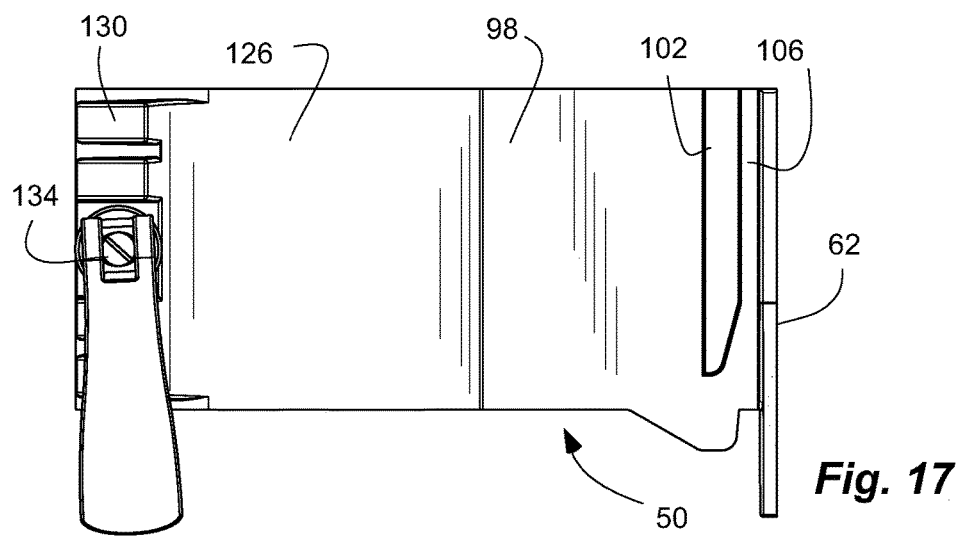
Figure 18:
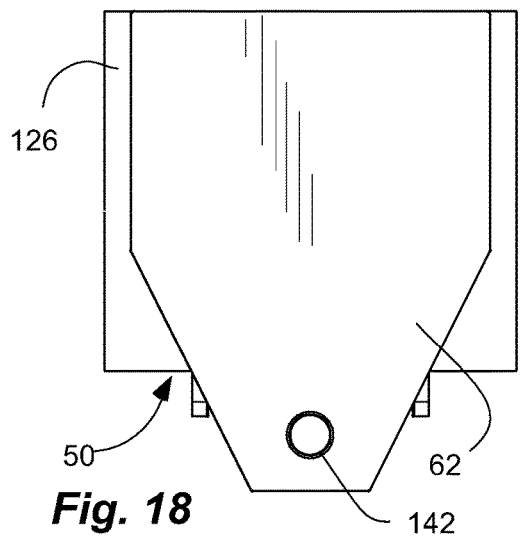
Figure 19:
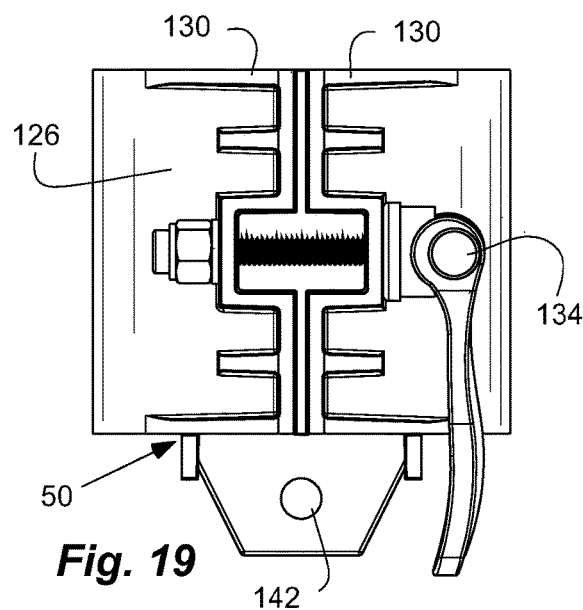
Figure 21:
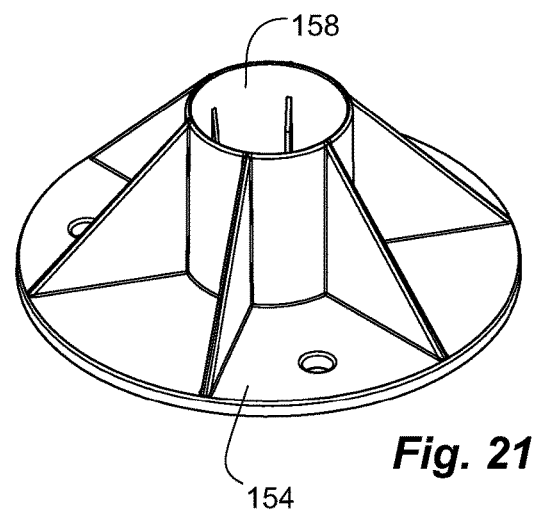
Figure 22:
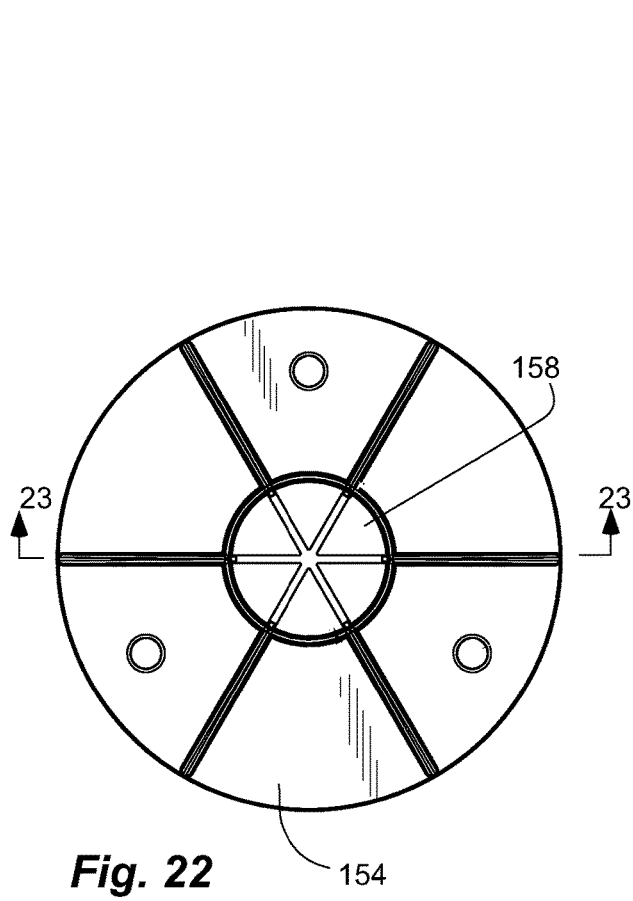
Figure 23:
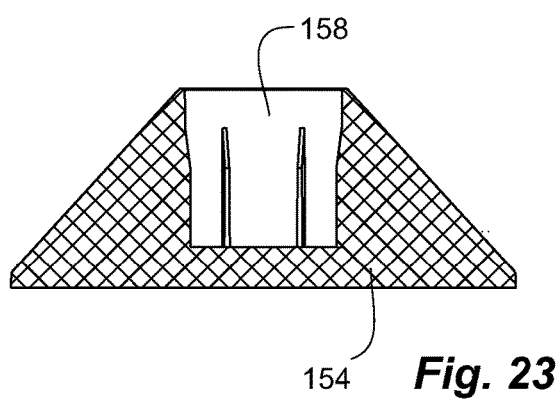
FIG. 23 is a cross-sectional side view of the foot of the mount system of FIG. 1a, taken along line 23 of FIG. 22.
Figure 24:
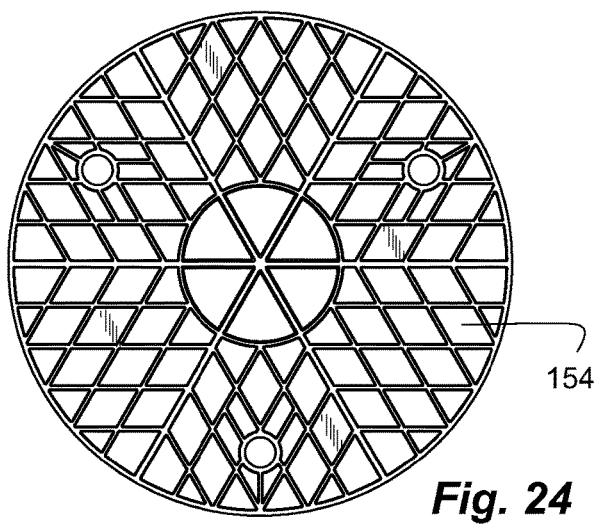

FIGS. 5-9 depict an example of the upper and lower pocket mounts 46 or 54, which can be identical or substantially the same. The pocket mount 46 or 54 can have a mount plate 70 with a front that faces outwardly and a back that faces inwardly and receives the adhesive or adhesive layer 58 (FIGS. 7, 10a and 10b). The mount plate 70 can also have a shallow open pocket 66 on the front of the mount plate 70. The pocket 66 can have or can be formed by upright lateral sides 78, a closed bottom 82, an open top 86 and a partially open front 90. The sides 78 and the bottom 82 can be, or can be formed by, walls extending outwardly from the mount plate 70. The sides 78 can be substantially vertically oriented, while the bottom 82 can be substantially horizontally oriented. The bottom 82 and/or the sides 78 can be tapered to form a tapering bottom to guide the insert plate 62 into alignment and a nesting relationship. Thus, the mounts 30 and 34 can be self-guiding. The pocket 66 can have a vertically oriented opening formed by at least the open top 86. Thus, the insert plate 62 can be inserted into the pocket 66 through the open top 86 in a vertical downward direction. The open front 90 can be narrower than the open top 86, and can include a taper to guide the insert plate into alignment and a nesting relationship. Thus, both a top of the pocket and a bottom of the pocket can be tapered inwardly and downwardly. The pocket 66 can have a front wall 92 in which the open front 90 is formed. The front wall 92 can have lateral sides and a bottom to retain the insert plate 62 therein. The mount plate 70 can carry the pocket 66, and can have an annular wall surrounding the pocket 66 to provide support above, below and alongside the pocket 66. The mount plate 70 can be open behind the pocket 66 to allow molding of the pocket. In addition, the lateral sides 78 and the bottom 82 of the pocket 66 can also be tapered downward and rearward, as well as inward, to further capture the insert plate. The interior of the pocket 66 can also taper inwardly and rearwardly. The pocket mounts 46 and 54 can have a thickness between the front and the back that is less than or equal to ½ inch. In addition, the mount plate 70 and the lateral sides 78 of the pocket 66 can be angled, such as at an acute angle with respect to a plane of the mount plate 70. Thus, the pocket mounts 46 and 54 can be thin enough, with angled plate and sides, to slide through a seal interface 94 between the RV 6 and the slider 38, as shown in FIG. 1c. The pocket mount 46 or 54 can be formed of plastic or metal, and can be formed by injection molding or 3*d* printing.

FIGS. 10*a* and 10*b* depict an example of the adhesive layer 58. As discussed above, the adhesive layer 58 can adhesively affix the pocket mounts 46 and 54, and thus the mounts 30 and 34 and the mast 26, to the skin of the RV 6 or the slider 38 thereof. In one aspect, the adhesive or the adhesive layer 58 can be semi-permanent. For example the adhesive layer 58 can comprise 3M VHB™ double sided adhesive tape. The adhesive layer 58 can be annular and can match the annular wall of the mount plate 70. The adhesive layer 58 can be disposed on the back of the mount plate 70 so that the pocket mounts 46 and 54 have an adhesive backing. The adhesive layer 58 can have a removable backing to protect the adhesive layer 58 prior to installation.

FIGS. 11*a*-14 depict an example of the upper insert 42 of the upper mount 30 that can be releasably coupled to the upper pocket mount 46. As described above, the upper insert 42 has an insert plate 62 sized and shaped to nest within the front pocket 66 of the upper pocket mount 46. The insert plate 62 can have a bottom that tapers inward and downward so that a bottom of the insert plate 62 is narrower than the open top 86 of the pocket 66 to facilitate insertion. A neck 98 extends outward from the insert plate 62, and through the open front 90 of the front pocket 66 of the upper pocket mount 46 when the insert plate is therein. The neck 98 can have a width that matches a width of the open front 90. A pair of opposite ribs 102 can be located on each side of the neck 98, vertically oriented and spaced-apart from the inert plate 62 to form a pair of opposite channels 106 to receive and grip the opposing sides of the front wall 92 of the pocket 66.

In addition, the upper insert 42 can have a friction collar 110 positioned on the neck 98. Thus, the friction collar 110 extends from the insert plate 62 via the neck 98. The friction collar 110 slidably receives the antenna mast 26 therein (FIGS. 2*a* and 2*b*). The collar 110 can be or can comprise a cylinder with a bore therethrough. The collar 110 and the mast 26 or section thereof can have or can form a friction fit. The terms "friction fit" and "interference fit" are terms of art used interchangeably herein to refer to deliberately causing, increasing and/or using friction to deliberately resist movement. An interference fit or friction fit is different than and greater than the existence of friction. While friction may exist between any two surfaces, is often desirable to do all one can to reduce this friction. An interference fit or friction fit can be distinguished from naturally occurring friction by being actually deliberately caused and increased. An interference fit can be created by dimensioning engaging parts so that their surfaces tightly bear against one another. A friction fit can also be created by surface roughness that is rougher or deliberate.

In one aspect, the collar 110 can have ribs 114 disposed in the bore or interior thereof and extending inwardly into the collar, and into sliding contact with the mast 26. The ribs 114 can be disposed in pairs opposing one another across the interior of the collar 110. The ribs 114 can be carried on flexible, cantilevered fingers 118 formed by a pair of slots 122 or cuts in the collar 110 or cylinder. Thus, the flexible fingers 118 can extend from the friction collar 110 to free ends. The flexible fingers 118 can form biasing members to bias the ribs 114 into contact with the mast 26. The fingers 118 can be disposed in pairs opposing one another across the interior of the collar 110 so that the fingers 118 provide opposing biasing force across the mast 26 to pinch or grip the mast 26 in the collar 110. The fingers 118 can be vertically oriented and parallel with the collar 110 and the mast 26. In one aspect, the upper insert 42 can have four ribs 114 carried by four fingers 118; with two ribs 114 and two fingers 118 adjacent the neck 98, and the other two opposing them across the interior of the collar. The fingers 118 and the ribs 114 can be sized to provide sufficient frictional force on the mast 26 to maintain a vertical position of the upper insert 42 on the mast 26, and carry the weight of the upper insert 42 on the mast 26, while the upper insert 42 is elevated on the mast 26 and free of the upper pocket mount 46; but allow the mast 26 to slide downwardly through the collar 110 when the upper insert 42 is coupled to the upper pocket mount 46 with the insert 62 in the pocket 66.

In one aspect, the interior or bore of the collar 110 can have a diameter greater than a diameter of the mast 26, or section thereof retained in the collar, to form an annular gap therebetween. The annular gap between the mast 26 and the collar 110 can allow for limited misalignment between the two to reduce strain on the interface between the insert plate 62 of the upper insert 42 and the pocket 66 of the upper pocket mount 46; and between the upper pocket mount 46 and the skin of the RV 6. The upper insert 42 can be formed of or can comprise plastic, and can be formed by injection molding.

FIGS. 15*a*-19 depict an example of the lower insert 50 of the lower mount 34 that can be releasably coupled to the lower pocket mount 54. As described above, the lower insert 50 has an insert plate 62 sized and shaped to nest within the front pocket 66 of the lower pocket mount 54. The insert plate 62 can have a bottom that tapers inward and downward so that a bottom of the insert plate 62 is narrower than the open top 86 of the pocket 66 to facilitate insertion. A neck 98 extends outward from the insert plate 62, and through the open front 90 of the front pocket 66 of the upper pocket mount 46 when the insert plate is therein. The neck 98 can have a width that matches a width of the open front 90. A pair of opposite ribs 102 can be located on each side of the neck 98, vertically oriented and spaced-apart from the inert plate 62 to form a pair of opposite channels 106 to receive and grip the opposing sides of the front wall of the pocket 66.

In addition, the lower insert 50 can have a clamp collar 126 positioned on the neck 98. Thus, the clamp collar 126 extends from the insert plate 62 via the neck 98. The clamp collar 126 slidably receives the antenna mast 26 therein. In addition, the clamp collar 126 is expandable and collapsible. The collar 126 can be or can comprise a cylinder with a bore therethrough. In addition, the collar 126 can be segmented at a slit to form opposite halves extending from the neck 98. Thus, the collar 126 can have a size, circumference or diameter that can be restricted to grip the mast 26 therein. A pair of flanges 130 can extend from the collar 126 on opposite sides of the slit so that the flanges 130 oppose one another. A fastener 134 can engage the clamp collar 126, such as at the pair of flanges 130, to selectively expand and collapse or restrict the clamp collar 126. Tightening the fastener 134 can draw the flanges 130 together and collapse the clamp collar 126. Loosening the fastener 134 can allow the flanges 130 to separate and the clamp collar 126 to expend. In one aspect, the fastener 134 can be a quick-release bolt binder skewer, as shown, with a lever arm. Thus, the clamp collar 126 can quickly bind and release the mast 26 therein by pivoting the lever arm. The clamp collar 126 can lock movement of the mast 26 both vertically and rotationally. Vertically locking the mast 26 can resist injury from tampering with the mast, such as by lifting it; while rotationally locking the mast 26 can preserve the direction orientation and signal strength. The lower insert 50 can be formed of or can comprise plastic or metal, and can be formed by injection molding or three dimensional (3d) printing.

FIG. 20 depicts an example of a locking mechanism 136 to lock or retain the lower insert 50 in the lower pocket mount 54, and thus lock vertical movement of the mast 26 with respect to the RV 6. The locking mechanism 136 can comprise a locking pin 138 insertable through a bore 142 (FIGS. 15a-19) in the lower insert 50 and a bore 146 (FIGS. 5-9) in the pocket mount 54. In one aspect, the locking pin 138 can be a detent pin with detent therein to resist removal of the locking pin from the bores. In another aspect, a lanyard 150 can be coupled to and between the locking pin 138, and the lower insert 50 to retain the locking pin 138 with the lower insert 50 and avoid misplacement or loss of the locking pin 138.

FIGS. 21-24 depict an example of a foot 154 that can be positioned on the bottom of the mast 26, and that can be disposed on the ground. Thus, weight of the mast 26 is transferred to the ground via the foot 154. In one aspect, the foot 154 can have a greater surface area or foot print than the mast 26. The foot 154 can have a cavity 158 to receive the bottom of the mast 26. The foot 154 can be formed of or can comprise plastic, and can be formed by injection molding.

In one aspect, the upper and lower inserts 42 and 50, the foot 154, and the antenna 22 can be retained on the mast 26. Thus, the mast 26, the upper and lower inserts 42 and 50, the foot 154 and the antenna 22 can form a stowable unit that can be stored in the RV 8, and deployed when needed. As described above, the mast 26 can have a collapsed length less than approximately 8 feet or 95 inches. In addition, the mast 26 with the upper and lower inserts 42 and 50, the foot 154 and the antenna 22 (or the stowable unit) can have a weight less than approximately 15 pounds. The upper and lower pocket mounts 46 and 54 can be installed and retained on the RV 6 of slider 38 thereof for ease of mounting the mast 26.

Initially, the upper and lower pocket mounts 46 and 54 can be installed on the RV 6 or slider 38 thereof, and left in place. The pocket mounts 46 and 54 can be installed by adhering the pocket mounts to the skin of the RV 6 or slider 38 thereof using the adhesive layer 58. The upper pocket mount 46 can be installed at or near the top of the RV 6. Thus, the upper pocket mount 46 may be 8-10 feet off of the ground; requiring a ladder for installation. The antenna 22 can be mounted to the top of the mast 26. The mast 26 with the antenna 22 thereon can be stowed in the RV 6.

A method for raising, erecting, deploying and/or hoisting the antenna 22 with respect to RV 6, with the upper and lower pocket mounts 46 and 54 thereon, comprises retrieving the telescoping mast 26 from the RV 6. As described above, the mast 26 can have the foot 154, the upper and lower inserts 42 and 50, and the antenna 22 thereon. The mast 26 can be extended. The upper insert 42, which is captive on the mast 26, can be elevated to an elevation of or above the upper pocket mount 46 and aligned with the opening 86 of the upper pocket mount 46. As described above, the upper insert 42 can be captive on the mast 26 by virtue of the friction fit between the friction collar 110 and the mast. Thus, a user on the ground can elevate the upper insert 42 without a ladder by simply raising the mast 26. The upper insert 42 is inserted into the upper pocket mount 46 by inserting the insert plate 62 into the pocket 66. The lower insert 50, which can be freely slidable on the mast 26, is raised or lowered to be aligned with the opening 86 of the lower pocket mount 54. The lower insert 50 is inserted into the lower pocket mount 54 by inserting the insert plate 62 into the pocket 66. The bottom or foot 154 of the mast 26 is rested on a support surface, such as the ground, so that the weight of the mast 26 and the antenna 22 are transferred to the ground. Resting the mast 26 or the foot 154 thereof on the ground can comprise allowing the mast 26 to slide in the friction collar 110 of the upper insert 42. As the upper insert 42 is retained in the upper pocket mount 46, the weight of the mast 26 and the antenna 22 can overcome the friction resistance of the friction collar 110 to allow the mast 26 to rest on the ground. The locking pin 138 can be inserted between the lower insert 50 and the lower pocket mount 54. As described below, the lower insert 50 can be clamped to the mast 26 so that the clamp collar 126 and the locking pin 138 retain the position and orientation of the mast 26 and the antenna 22.

In addition, the method can comprise rotating the mast 26 to align the antenna 22 in a predetermined orientation. The mast 26 can be clamped in the clamp collar 126 associated with the lower insert 50 to resist rotation of the mast with respect to the clamp collar, and thus the RV 6.

Furthermore, the method can comprise lowering, retracting, withdrawing and/or retrieving the antenna 22 and mast 26. The locking pin 138 can be removed. The clamp collar 126 can be released. The lower insert 50 can be removed from the lower pocket mount 54, such as by lifting the insert plate 62 from the pocket 66. The upper insert 42 can be removed from the upper pocket mount 46, such as by lifting the mast 26 with the upper insert 42 thereon, thus removing the insert plate 62 from the pocket 66. Because the friction collar 110 retains the upper insert 42 on the mast 26, simply lifting the mast 26 forces the upper insert 42 out of the upper pocket mount 46. In another aspect, lifting the mast 26 can simultaneously remove the upper and lower inserts 42 and 50 from the upper and lower pocket mounts 46 and 54, respectively. The mast 26 can be collapsed and stowed in the RV 6.

The slider 38 can be extended from the RV 6 prior to inserting the upper and lower inserts 42 and 50 into the upper and lower pocket mounts 46 and 54, respectively. The upper and lower pocket mounts 46 and 54 can slide through the seal interface 94 between the RV 6 and the slider 38. Similarly, the slider 38 can be retracted into the RV 6 after removing the upper and lower inserts 42 and 50 from the upper and lower pocket mounts 46 and 54, respectively. Again, the upper and lower pocket mounts 46 and 54 can slide through the seal interface 94 between the RV 6 and the slider 38.

The mount system 10 described herein can also be used with other accessories or RV accessories, such as flags, lighting, etc.

The repeater 8 can be configured to amplify one or more RF uplink and downlink communication signals to increase a signal strength of the RF communication signals to be received by a wireless user device 162 (FIGS. 1a and 1b) and/or transmitted by the wireless user device. The repeater can, for example, amplify various types of RF signals, such as cellular telephone, WiFi, satellite, or amplitude modulated/frequency modulated (AM/FM) radio signals. In one instance, one or more bi-direction amplifiers of the repeater can be configured to amplify both uplink and downlink signals of one or more carrier bands or channels. In one instance, the RF communication signals can be cellular telephone RF signals, such as a Third-Generation Partnership Project (3GPP) Long Term Evolved (LTE) or 5G uplink and downlink signals. In one instance, the uplink 3GPP LTE or 5G signals may operate in a first channel of a selected first frequency band and the downlink 3GPP LTE signal may operate at a second channel of the selected frequency band.

In one configuration, the repeater 8 can be a Federal Communications Commission (FCC)-compatible consumer repeater. As a non-limiting example, the repeater 8 can be compatible with FCC Part 20 or 47 Code of Federal Regulations (C.F.R.) Part 20.21 (Mar. 21, 2013). In addition, the handheld booster can operate on the frequencies used for the provision of subscriber-based services under parts 22 (Cellular), 24 (Broadband PCS), 27 (AWS-1, 700 megahertz (MHz) Lower A-E Blocks, and 700 MHz Upper C Block), and 90 (Specialized Mobile Radio) of 47 C.F.R. The repeater 8 can be configured to automatically self-monitor its operation to ensure compliance with applicable noise and gain limits. The repeater 8 can either self-correct or shut down automatically if the repeater's operations violate the regulations defined in 47 CFR Part 20.21. While a repeater that is compatible with FCC regulations is provided as an example, it is not intended to be limiting. The repeater can be configured to be compatible with other governmental regulations based on the location where the repeater is configured to operate.

In one configuration, the repeater 8 can improve the wireless connection between the wireless device 310 and the base station 330 (e.g., cell tower) or another type of wireless wide area network (WWAN) access point (AP) by amplifying desired signals relative to a noise floor. The repeater 8 can boost signals for cellular standards, such as the Third Generation Partnership Project (3GPP) Long Term Evolution (LTE) Release 8, 9, 10, 11, 12, 13, 14, 15, or 16 standards or Institute of Electronics and Electrical Engineers (IEEE) 802.16. In one configuration, the repeater 8 can boost signals for 3GPP LTE Release 16.1.0 (March 2019) or other desired releases.

The repeater 8 can boost signals from the 3GPP Technical Specification (TS) 36.101 (Release 16 Jan. 2019) bands or LTE frequency bands. For example, the repeater 8 can boost signals from the LTE frequency bands: 2, 4, 5, 12, 13, 17, 25, and 26. In addition, the repeater 8 can boost selected frequency bands based on the country or region in which the repeater is used, including any of bands 1-85 or other bands, as disclosed in 3GPP TS 36.104 V16.1.0 (March 2019), and depicted in Table 1:

TABLE 1

| LTE Operating Band | Uplink (UL) operating band BS receive UE transmit $F_{UL\_low}\text{-}F_{UL\_high}$ | Downlink (DL) operating band BS transmit UE receive $F_{DL\_low}\text{-}F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6 (NOTE 1) | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23[1] | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A | 717 MHz-728 MHz | FDD (NOTE 2) |
| 30 | 2305 MHz-2315 MHz | 2350 MHz-2360 MHz | FDD |
| 31 | 452.5 MHz-457.5 MHz | 462.5 MHz-467.5 MHz | FDD |
| 32 | N/A | 1452 MHz-1496 MHz | FDD (NOTE 2) |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |
| 45 | 1447 MHz-1467 MHz | 1447 MHz-1467 MHz | TDD |
| 46 | 5150 MHz-5925 MHz | 5150 MHz-5925 MHz | TDD (NOTE 3, |

TABLE 1-continued

| LTE Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| | | | NOTE 4) |
| 47 | 5855 MHz-5925 MHz | 5855 MHz-5925 MHz | TDD |
| 48 | 3550 MHz-3700 MHz | 3550 MHz-3700 MHz | TDD |
| 49 | 3550 MHz-3700 MHz | 3550 MHz-3700 MHz | TDD (NOTE 8) |
| 50 | 1432 MHz-1517 MHz | 1432 MHz-1517 MHz | TDD |
| 51 | 1427 MHz-1432 MHz | 1427 MHz-1432 MHz | TDD |
| 52 | 3300 MHz-3400 MHz | 3300 MHz-3400 MHz | TDD |
| 53 | 2483.5 MHz-2495 MHz | 2483.5 MHz-2495 MHz | TDD |
| 65 | 1920 MHz-2010 MHz | 2110 MHz-2200 MHz | FDD |
| 66 | 1710 MHz-1780 MHz | 2110 MHz-2200 MHz | FDD (NOTE 5) |
| 67 | N/A | 738 MHz-758 MHz | FDD (NOTE 2) |
| 68 | 698 MHz-728 MHz | 753 MHz-783 MHz | FDD |
| 69 | N/A | 2570 MHz-2620 MHz | FDD (NOTE 2) |
| 70 | 1695 MHz-1710 MHz | 1995 MHz-2020 MHz | FDD[6] |
| 71 | 663 MHz-698 MHz | 617 MHz-652 MHz | FDD |
| 72 | 451 MHz-456 MHz | 461 MHz-466 MHz | FDD |
| 73 | 450 MHz-455 MHz | 460 MHz-465 MHz | FDD |
| 74 | 1427 MHz-1470 MHz | 1475 MHz-1518 MHz | FDD |
| 75 | N/A | 1432 MHz-1517 MHz | FDD (NOTE 2) |
| 76 | N/A | 1427 MHz-1432 MHz | FDD (NOTE 2) |
| 85 | 698 MHz-716 MHz | 728 MHz-746 MHz | FDD |

(NOTE 1): Band 6, 23 are not applicable.
(NOTE 2): Restricted to E-UTRA operation when carrier aggregation is configured. The downlink operating band is paired with the uplink operating band (external) of the carrier aggregation configuration that is supporting the configured Pcell.
(NOTE 3): This band is an unlicensed band restricted to licensed-assisted operation using Frame Structure Type 3.
(NOTE 4): Band 46 is divided into four sub-bands as in Table 5.5-1A.
(NOTE 5): The range 2180-2200 MHz of the DL operating band is restricted to E-UTRA operation when carrier aggregation is configured.
[6]The range 2010-2020 MHz of the DL operating band is restricted to E-UTRA operation when carrier aggregation is configured and TX-RX separation is 300 MHz. The range 2005-2020 MHz of the DL operating band is restricted to E-UTRA operation when carrier aggregation is configured and TX-RX separation is 295 MHz.
(NOTE 7): Void
(NOTE 8): This band is restricted to licensed-assisted operation using Frame Structure Type 3.

In another configuration, the repeater 8 can boost signals from the 3GPP Technical Specification (TS) 38.104 (Release 15 Jan. 2019) bands or 5G frequency bands. In addition, the repeater 8 can boost selected frequency bands based on the country or region in which the repeater is used, including any of bands n1-n86 in frequency range 1 (FR1), n257 n261 in frequency range 2 (FR2), or other bands, as disclosed in 3GPP TS 38.104 V15.5.0 (March 2019), and depicted in Table 2 and Table 3:

TABLE 2

| NR operating band | Uplink (UL) operating band BS receive/UE transmit $F_{UL,low}$-$F_{UL,high}$ | Downlink (DL) operating band BS transmit/UE receive $F_{DL,low}$-$F_{DL,high}$ | Duplex Mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n12 | 699 MHz-716 MHz | 729 MHz-746 MHz | FDD |
| n20 | 832 MHz-862 MHz | 791 MHz-821 MHz | FDD |
| n25 | 1850 MHz-1915 MHz | 1930 MHz-1995 MHz | FDD |
| n28 | 703 MHz-748 MHz | 758 MHz-803 MHz | FDD |
| n34 | 2010 MHz-2025 MHz | 2010 MHz-2025 MHz | TDD |
| n38 | 2570 MHz-2620 MHz | 2570 MHz-2620 MHz | TDD |
| n39 | 1880 MHz-1920 MHz | 1880 MHz-1920 MHz | TDD |
| n40 | 2300 MHz-2400 MHz | 2300 MHz-2400 MHz | TDD |
| n41 | 2496 MHz-2690 MHz | 2496 MHz-2690 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n65 | 1920 MHz-2010 MHz | 2110 MHz-2200 MHz | FDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |
| n86 | 1710 MHz-1780 MHz | N/A | SUL |

TABLE 3

| NR operating band | Uplink (UL) and Downlink (DL) operating band BS transmit/receive UE transmit/receive $F_{UL,low}$-$F_{UL,high}$ $F_{DL,low}$-$F_{DL,high}$ | Duplex Mode |
|---|---|---|
| n257 | 26500 MHz-29500 MHz | TDD |
| n258 | 24250 MHz-27500 MHz | TDD |
| n260 | 37000 MHz-40000 MHz | TDD |
| n261 | 27500 MHz-28350 MHz | TDD |

New bands for 3GPP LTE operation are frequently disclosed. The repeater can be configured to amplify any desired band that may be used by a wireless mobile device. The repeater can also be configured to simultaneously filter and amplify a plurality of bands simultaneously.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

Various techniques, or certain aspects or portions thereof, may take the form of program code (i.e., instructions) embodied in tangible media, such as floppy diskettes, compact disc-read-only memory (CD-ROMs), hard drives, transitory or non-transitory computer readable storage medium, or any other machine-readable storage medium wherein, when the program code is loaded into and executed by a machine, such as a computer, the machine becomes an apparatus for practicing the various techniques. Circuitry may include hardware, firmware, program code, executable code, computer instructions, and/or software. A non-transitory computer readable storage medium may be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high-level procedural or object-oriented programming language to communicate with a computer system. However, the program(s) may be implemented in assembly or machine language, if desired. In any case, the language may be a compiled or interpreted language, and combined with hardware implementations.

As used herein, the term processor may include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module cannot be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as de facto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology may be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation may be made without the exercise of inventive faculty, and without departing from the principles and concepts of the technology. Accordingly, it is not intended that the technology be limited, except as by the claims set forth below.

What is claimed is:

1. A mount system configured to mount an accessory to a recreational vehicle (RV), the mount system comprising:
   a telescoping mast having a bottom and a top configured to be coupled to the accessory;
   an upper mount coupled to the mast and configured to couple the mast to the RV, and the upper mount comprising an upper insert carried by the mast and removably coupled to an upper pocket mount configured to be carried by the RV; and
   a lower mount coupled to the mast and spaced-apart from the upper mount and configured to couple the mast to the RV, the lower mount comprising a lower insert carried by the mast and removably coupled to a lower pocket mount configured to be carried by the RV spaced-apart from the upper pocket mount.

2. The mount system of claim 1, wherein upper and lower pocket mounts each have an adhesive layer configured to adhesively affix to the RV without mechanical fasteners.

3. The mount system of claim 1, further comprising:
   a foot on the bottom of the mast configured to be disposed on the ground.

4. The mount system of claim 1, wherein the upper and lower mounts each comprise:
   a vertically oriented opening in each of the upper and lower pocket mounts to vertically receive each of the upper and lower inserts, respectively.

5. The mount system of claim 1, wherein the upper and lower pocket mounts each comprise:
   a mount plate with a front and a back;
   an adhesive layer disposed on the back of the mount plate; and
   a shallow open pocket on the front of the mount plate with upright lateral sides, a substantially closed bottom, an open top and a partially open front.

6. The mount system of claim 5, wherein the pocket mounts each have a thickness less than ½ inch.

7. The mount system of claim 5, wherein the pocket mounts each have a tapering bottom.

8. The mount system of claim 5, wherein the upper insert comprises:
   an insert plate sized and shaped to nest within the front pocket of the pocket mount;
   a neck extending outward from the insert plate and through the open front of the front pocket of the pocket mount when the insert plate is therein; and
   a friction collar positioned on the neck and slidably receiving the mast therein.

9. The mount system of claim 5, wherein the friction collar comprises:
   flexible fingers extending from the friction collar to free ends; and
   ribs disposed on the flexible fingers extending into the collar an into sliding contact with the mast.

10. The mount system of claim 5, wherein the lower insert comprises:
    an insert plate sized and shaped to nest within the front pocket of the pocket mount;
    a neck extending outward from the insert plate and through the open front of the front pocket of the pocket mount when the insert plate is therein; and
    a clamp collar positioned on the neck and slidably receiving the mast therein, the clamp collar being expandable and collapsible.

11. The mount system of claim 10, wherein the lower insert comprises:
    a fastener engaging the clamp collar and operable to selectively expand and collapse the clamp collar.

12. The mount system of claim 10, further comprising:
    a locking pin insertable through a bore in the insert plate and a bore in the pocket mount.

13. The mount system of claim 1, further comprising an antenna coupled to the top of the mast, the antenna being an exterior donor antenna operatively coupled to an interior server antenna disposed inside the RV, the mast having a height capable of elevating the antenna at least 19 feet above the interior server antenna disposed in the RV.

14. The mount system of claim 1, further comprising an antenna coupled to the top of the mast, the antenna being an exterior donor antenna operatively coupled to an interior server antenna disposed inside the RV, the mast having a height capable of elevating the antenna at least 23 feet above the ground.

15. The mount system of claim 1, further comprising an antenna coupled to a top of the mast, the antenna being an exterior donor antenna operatively coupled to a wireless repeater in the RV, the wireless repeater being operatively coupled to an interior server antenna disposed inside the RV.

16. A mount system configured to mount a mast to a recreational vehicle (RV), the mount system comprising:
    upper and lower pocket mounts configured to be mounted to the RV at upper and lower locations, respectively, each pocket mount comprising:
      a mount plate with a front and a back;
      an adhesive layer disposed on the back of the mount plate; and
      a shallow open pocket on the front of the mount plate with upright lateral sides, a closed bottom, an open top and a partially open front;
    an upper insert removably couplable to the upper pocket mount, the upper insert comprising:
      an insert plate sized and shaped to nest within the front pocket of the upper pocket mount;
      a neck extending outward from the insert plate and through the open front of the front pocket of the upper pocket mount when the insert plate is therein; and
      a friction collar positioned on the neck and configured to slidably receive the mast therein; and
    a lower insert removably couplable to the lower pocket mount, the lower insert comprising:
      an insert plate sized and shaped to nest within the front pocket of the lower pocket mount;
      a neck extending outward from the insert plate and through the open front of the front pocket of the lower pocket mount when the insert plate is therein;

a clamp collar positioned on the neck and configured to slidably receive the mast therein, the clamp collar being expandable and collapsible; and a fastener engaging the clamp collar and operable to selectively expand and collapse the clamp collar.

17. The mount system of claim 16, further comprising:
a telescoping mast received in the friction collar and the clamp collar; and
a foot disposed on a bottom of the mast.

18. The mount system of claim 17, wherein the friction collar comprises:
flexible fingers extending from the friction collar to free ends; and
ribs disposed on the flexible fingers extending into the collar an into sliding contact with the mast.

19. The mount system of claim 17, further comprising:
an antenna disposed on a top of the mast.

20. The mount system of claim 19, wherein the antenna is an exterior donor antenna operatively coupled to an interior server antenna disposed inside the RV, the mast having a height capable of elevating the antenna at least 19 feet above the interior server antenna disposed in the RV.

21. The mount system of claim 19, wherein the antenna is an exterior donor antenna operatively coupled to an interior server antenna disposed inside the RV, the mast having a height capable of elevating the antenna at least 23 feet above the ground.

22. The mount system of claim 19, wherein the antenna is an exterior donor antenna operatively coupled to a wireless repeater in the RV, the wireless repeater being operatively coupled to an interior server antenna disposed inside the RV.

23. The mount system of claim 16, further comprising:
a locking pin insertable through a bore in the lower pocket mount and a bore in the insert plate.

24. The mount system of claim 16, wherein the pocket mounts each have a thickness less than ½ inch.

25. The mount system of claim 16, wherein the pocket mounts each have a tapering bottom.

26. A method for raising an antenna with respect to a recreational vehicle (RV) with a slider having upper and lower pocket mounts thereon, the method comprising:
retrieving a telescoping mast from the RV, the mast having a bottom and a top with the antenna mounted to the top;
extending the mast;
elevating an upper insert captive on the mast to an elevation of or above the upper pocket mount and aligning the insert with an opening of the upper pocket mount;
inserting the upper insert into the upper pocket mount;
aligning a lower insert on the mast with an opening of the lower pocket mount;
inserting the lower insert into the lower pocket mount; and resting the bottom of the mast on a support surface such that a weight of the mast and the antenna are transferred to the support surface.

27. The method of claim 26, further comprising:
rotating the mast to align the antenna in a predetermined orientation; and
clamping the mast in a clamp collar associated with the lower insert to resist rotation of the mast with respect to the clamp collar, and thus the RV.

28. The method of claim 27, further comprising:
releasing the clamp collar;
removing the lower insert from the lower pocket mount;
lifting the mast and removing the upper insert from the upper pocket mount;
collapsing the mast; and
stowing the mast in the RV.

29. The method of claim 26, further comprising:
extending the slider from the RV prior to inserting the upper and lower inserts into the upper and lower pocket mounts, respectively, with the upper and lower pocket mounts sliding through a seal interface between the RV and the slider; and
retracting the slider into the RV after removing the upper and lower inserts from the upper and lower pocket mounts, respectively, with the upper and lower pocket mounts sliding through the seal interface between the RV and the slider.

30. The method of claim 26, further comprising:
sliding the mast through a friction collar associated with the upper insert while resting the bottom of the mast on a support surface; and
sliding a clamping collar of the clamp of the lower insert while aligning the lower insert on the mast with the opening of the lower pocket mount.

31. The method of claim 26, wherein the antenna is an exterior donor antenna operatively coupled to an interior server antenna disposed inside the RV, the method further comprising:
elevating the antenna at least 19 feet above the interior server antenna disposed in the RV.

32. The method of claim 26, wherein the antenna is an exterior donor antenna operatively coupled to an interior server antenna disposed inside the RV, the method further comprising:
elevating the antenna at least 23 feet above the ground.

33. The method of claim 26, wherein the antenna is an exterior donor antenna operatively coupled to a wireless repeater in the RV; and wherein the wireless repeater is operatively coupled to an interior server antenna disposed inside the RV.

* * * * *